(12) United States Patent
Marks et al.

(10) Patent No.: US 8,830,377 B2
(45) Date of Patent: Sep. 9, 2014

(54) MONOCENTRIC LENS-BASED MULTI-SCALE OPTICAL SYSTEMS AND METHODS OF USE

(75) Inventors: Daniel Marks, Durham, NC (US); David Jones Brady, Durham, NC (US)

(73) Assignee: Duke University, Durham, NC (US)

(*) Notice: Subject to any disclaimer, the term of this patent is extended or adjusted under 35 U.S.C. 154(b) by 177 days.

(21) Appl. No.: 13/095,407

(22) Filed: Apr. 27, 2011

(65) Prior Publication Data

US 2011/0211106 A1 Sep. 1, 2011

Related U.S. Application Data

(63) Continuation-in-part of application No. 12/651,894, filed on Jan. 4, 2010, now Pat. No. 8,259,212.

(60) Provisional application No. 61/328,213, filed on Apr. 27, 2010.

(51) Int. Cl.
*H04N 5/225* (2006.01)
*G02B 13/06* (2006.01)
*H04N 5/262* (2006.01)
*G02B 27/00* (2006.01)

(52) U.S. Cl.
CPC ............. *G02B 13/06* (2013.01); *H04N 5/2254* (2013.01); *H04N 5/2624* (2013.01); *G02B 27/0025* (2013.01)
USPC ........................................ 348/340; 348/218.1

(58) Field of Classification Search
USPC ............................................. 348/340, 218.1
See application file for complete search history.

(56) References Cited

U.S. PATENT DOCUMENTS

| 4,323,925 | A | | 4/1982 | Abell et al. |
| 5,004,328 | A | * | 4/1991 | Suzuki et al. ................. 359/664 |
| 5,012,081 | A | * | 4/1991 | Jungwirth et al. ......... 250/203.6 |

(Continued)

FOREIGN PATENT DOCUMENTS

| EP | 0809124 A2 | 11/1997 |
| EP | 0893915 A2 | 1/1999 |

(Continued)

OTHER PUBLICATIONS

Quertemont, Eric, "PCT Application No. PCT/US2011/034156 International Search Report Sep. 23, 2011", , Publisher: PCT, Published in: PCT.

(Continued)

*Primary Examiner* — Nicholas Giles
*Assistant Examiner* — Abdelaaziz Tissire
(74) *Attorney, Agent, or Firm* — Kaplan Breyer Schwarz & Ottesen LLP

(57) ABSTRACT

A monocentric lens-based multi-scale imaging system is disclosed. Embodiments of the present invention comprise a monocentric lens as an objective lens that collects light from a scene. Monocentric lenses in accordance with the present invention include a spherical central lens element and a plurality of lens shell sections that collectively reduce at least one of spherical and chromatic aberration from the magnitude introduced by the spherical lens element itself. A plurality of secondary lenses image the scene through the objective lens and further reduce the magnitude of aberrations introduced by the objective lens. A plurality of sensor arrays converts optical sub-images of the scene into a plurality of digital images, which can then be used to form a composite image of the scene.

35 Claims, 15 Drawing Sheets

(56) References Cited

U.S. PATENT DOCUMENTS

| | | | |
|---|---|---|---|
| 5,233,174 A * | 8/1993 | Zmek | 250/201.9 |
| 6,137,535 A | 10/2000 | Meyers | |
| 6,233,100 B1 * | 5/2001 | Chen et al. | 359/727 |
| 6,320,703 B1 * | 11/2001 | Chen et al. | 359/753 |
| 6,339,506 B1 | 1/2002 | Wakelin et al. | |
| 6,556,349 B2 | 4/2003 | Cox et al. | |
| 7,499,094 B2 | 3/2009 | Kuriyama | |
| 7,728,901 B2 | 6/2010 | Onozawa et al. | |
| 8,049,806 B2 | 11/2011 | Feldman et al. | |
| 2001/0026322 A1 | 10/2001 | Takahashi et al. | |
| 2002/0075452 A1 * | 6/2002 | Kessler et al. | 353/7 |
| 2002/0196554 A1 * | 12/2002 | Cobb et al. | 359/633 |
| 2003/0231255 A1 | 12/2003 | Szajewski et al. | |
| 2004/0061787 A1 | 4/2004 | Liu et al. | |
| 2004/0212882 A1 * | 10/2004 | Liang et al. | 359/462 |
| 2004/0223071 A1 | 11/2004 | Wells et al. | |
| 2004/0257460 A1 | 12/2004 | Kuriyama | |
| 2005/0052751 A1 | 3/2005 | Liu et al. | |
| 2006/0055811 A1 * | 3/2006 | Frtiz et al. | 348/340 |
| 2007/0109438 A1 | 5/2007 | Duparre et al. | |
| 2007/0200946 A1 | 8/2007 | Onozawa et al. | |
| 2007/0252074 A1 | 11/2007 | Ng et al. | |
| 2011/0211106 A1 * | 9/2011 | Marks et al. | 348/340 |
| 2013/0076900 A1 * | 3/2013 | Mrozek et al. | 348/144 |

FOREIGN PATENT DOCUMENTS

| | | |
|---|---|---|
| JP | 035999 A | 2/1995 |
| JP | 2001-005054 A | 1/2001 |
| JP | 2003-283932 A | 10/2003 |
| JP | 2004-151718 A | 5/2004 |
| JP | 2007-004471 A | 1/2007 |
| WO | 9523349 A1 | 8/1995 |
| WO | WO 9523349 A1 * | 8/1995 ............... G02B 3/00 |
| WO | 9926419 A1 | 5/1999 |

OTHER PUBLICATIONS

Hiroshima, "Related Japanese Patent Application No. JP2011-544647 Office Action", Dec. 11, 2012, Publisher: JPO, Published in: JP.

Jerabek, Kelly L., "U.S. Appl. No. 12/651,894 Office Action Mar. 14, 2012",, Publisher: USPTO, Published in: US.

Lam, Edmund Y., "Compact and Thin Multi-lens System for Machine Vision Applications", "Image Processing: Machine Vision Applications", 2008, vol. 6813, Publisher: SPIE-IS&T Electronic Imaging.

Duparre et al., "Microoptical telescope compound eye", "Optics Express", Feb. 7, 2005, vol. 13, No. 3, Publisher: Optical Society of America, Published in: US.

Brady et al., "Multiscale lens design", "Optics Express 10659", Jun. 22, 2009, vol. 17, No. 13, Publisher: Optical Society of America, Published in: US.

Christensen et al., "Multiscale Optical Design for Global Chip-to-Chip Optical Interconnections and Misalignment Tolerant Packaging", "IEEE Journal on Selected Topics in Quantum Electronics", Mar./Apr. 2003, vol. 9, No. 2, Publisher: IEEE.

Duparre et al., "Thin compound-eye camera", "Applied Optics XP-002578598", 2005, vol. 44, No. 15, Publisher: Optical Society of America, Published in: US.

Hylla, Winfried, "PCT Application No. PCT/US2010/020077 International Preliminary Report on Patentability Mar. 31, 2011",, Publisher: PCT, Published in: PCT.

Hylla, Winfried, "PCT Application No. PCT/US2010/020077 International Search Report May 4, 2010",, Publisher: PCT, Published in: PCT.

"Related Japanese Patent Application No. JP 2011-544647", "Office Action", Dec. 3, 2013, Publisher: JPO, Published in: JP.

* cited by examiner

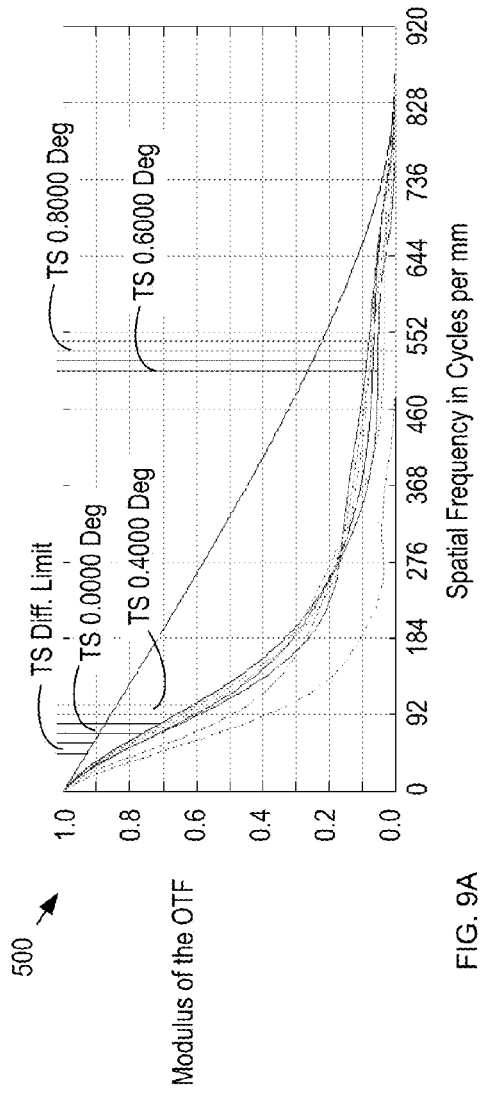
FIG. 9A
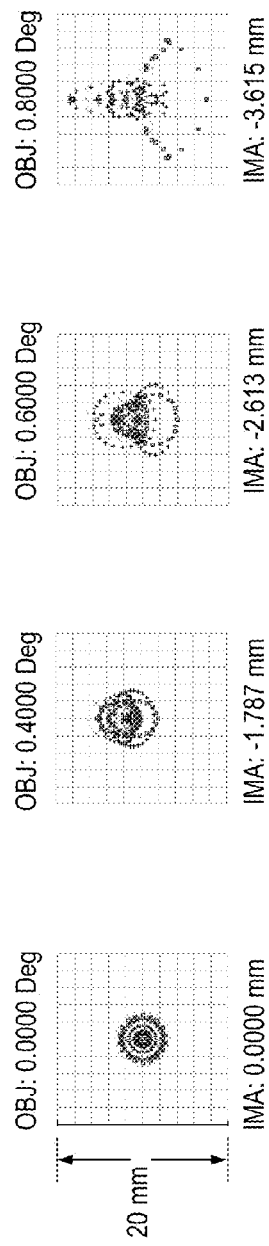
FIG. 9B
FIG. 9C
FIG. 9D
FIG. 9E

MONOCENTRIC LENS-BASED MULTI-SCALE OPTICAL SYSTEMS AND METHODS OF USE

CROSS REFERENCE TO RELATED APPLICATIONS

This case is a continuation-in-part of co-pending U.S. patent application Ser. No. 12/651,894 filed 4 Jan. 2010, which is incorporated herein by reference in its entirety.

This application also claims the benefit of U.S. Provisional Patent Application Ser. No. 61/328,213, filed Apr. 27, 2010, entitled "Monocentric Lenses for Multi-scale Optical Systems and Methods of Use," which is incorporated herein by reference in its entirety.

FIELD OF THE INVENTION

The present invention relates to optics in general, and, more particularly, to imaging systems.

BACKGROUND OF THE INVENTION

A digital camera system is normally based on a lens system comprising a number of optical elements that image a scene onto an array of optoelectronic detector elements. As digital camera systems have evolved, these optical elements and detector arrays have been becoming progressively smaller. Unfortunately, angular resolution and number of resolvable object points typically scale with the size of an imaging system. As a result, the optical performance of such camera systems begins to suffer as the optical elements and detector elements continue to shrink.

Typically, it is desirable for the lens system to (1) collect as much of the light signal as possible over as large an aperture as possible; and (2) process the collected light signal to either form an optical image on the detector array or to encode the light signal for digital image estimation. Each detector in the detector array receives light from the lens system and converts it into an electrical signal whose magnitude is a function of light intensity. These electrical signals are then processed to develop a composite digital image of the scene and/or estimate one or more properties of the scene.

Lens system design begins by specifying targets for major performance metrics, such as angular resolution, field-of-view, depth of field, spectral range, sensitivity, dynamic range, system mass and volume. Angular resolution is generally the most significant initial metric. The best angular resolution of a lens is given by $\lambda/A$, where $\lambda$ is the operating wavelength and A is the collection aperture diameter. Once the collection aperture size has been determined by this relationship, a lens is designed to achieve the remaining performance metrics by judicious choice of materials and surface profiles.

In conventional lens design, the aperture size of an entrance lens or optical stop (i.e., the primary aperture) often determines the effective aperture size of all subsequent lens surfaces (i.e., the secondary aperture) in the lens system. The use of multiple lenses and apertures enables a lens system to simultaneously create an effective focal length and magnification appropriate to the imaging task at hand, reduce image aberrations, and provide correct image orientation. Secondary apertures are typically matched to the effective cross section of the magnified or demagnified entrance aperture propagated through the lens system. In systems with low aberration, the size of the entrance aperture often determines angular resolution of the lens system while the size of the secondary apertures determines the field-of-view of the lens system.

Simple cameras typically balance field-of-view and resolution by using a sequence of lenses having approximately equally sized apertures. Microscopes, on the other hand, achieve large field-of-view and high angular resolution by increasing secondary aperture relative to the collection aperture. Telescopes achieve extra-ordinary angular resolution with a limited field-of-view by decreasing secondary aperture size. Wide-field cameras achieve large field-of-view by tolerating significant aberration across the image with approximately equal primary and secondary apertures. Conventional lens design, therefore, normally requires trade-offs between desired performance metrics. For example, telescopes achieve high angular resolution by sacrificing field-of-view, wide-field imagers achieve large angular fields-of-view by sacrificing diffraction-limited angular resolution, and compound-optics cameras achieve high quality by expanding system volume to include more aberration-correction optics.

In order to overcome some of the limitations of standard imaging optics, multi-aperture cameras have been developed. In multi-aperture systems, a standard cameran objective lens is replaced by an array of lenslets, wherein each lenslet has a reduced focal length in comparison to a conventional camera. In such approaches, a detector measures a set of sub-sampled versions of the object within the field-of-view. Post-processing algorithms are used to generate a high-resolution image from the set of sub-sampled sub-images. The result is reduced system volume; however, the reduction in system volume is achieved at the cost of significant computational post-processing and compromised image quality.

In addition, the design space for multi-aperture cameras is severely restricted, which has limited their adoption in practical systems. The use of a multi-aperture camera requires that the size of its detector array and system aperture be approximately the same size. As a result, conventional multi-aperture designs are generally restricted to very small collection apertures. This also limits the number of camera formats that can be designed. Further, a multi-aperture camera typically has a restricted field-of-view due to a need to prevent the overlapping of sub-images on the detector array. Such overlapping can be avoided by introducing a field stop in the optical design; however, this increases system volume. Alternatively, absorbing barriers can be placed between the sub-image regions of the detector array; however, this significantly increases manufacturing cost and complexity.

For these reasons, a lens system that avoids some of the design trade-offs associated with conventional lens design and that achieves high performance cost-effectively is desirable.

SUMMARY OF THE INVENTION

The present invention enables optical systems that overcome some of the disadvantages of the prior art. Specifically, the present invention enables multi-scale optical system designs based on an objective lens that is a monocentric compound lens, wherein the objective lens has a spherical geometry and includes a plurality of shell segments. Embodiments of the present invention are particularly well suited for use in high-altitude surveillance systems and wide-field astronomical sky surveying systems.

In an optical system in accordance with the present invention, an objective lens collects light from a scene and images the light at a substantially spherically shaped image field. A substantially spherically shaped arrangement of secondary lenses is located near, but displaced from, the image field.

Each secondary lens processes light received from the objective lens and images it onto a corresponding sensor array, which converts the imaged light into a digital representation of a portion of the scene. The substantially spherically shape of the arrangement of secondary lenses affords embodiments of the present invention the ability to mitigate the effects of field curvature in the output of the objective lens.

An objective lens in accordance with the present invention is characterized by a layered structure that includes a spherical central lens element and one or more spherically shaped lens shells, wherein all surfaces have a common center of curvature. The lens shells are designed so that refraction at interior surface of the objective lens produces negative spherical aberration that offsets the positive spherical aberration introduced at the entry surface of the objective lens. The spherically shaped lens shells further enable a reduction in the magnitude of each of chromatic and spherical aberrations in the output of the lens. This reduces the magnitude of chromatic and spherical aberration correction required by the secondary lenses in order to achieve a high-quality image of the scene at the sensor arrays. As a result, the prescription of each secondary lens can be less severe, which, in turn, reduces the amount of coma and astigmatism introduced by the secondary lenses into their respective image fields. In addition, simpler secondary lenses enable a smaller overall optical system volume. Further, a simpler prescription enables secondary lenses that are easier and cheaper to manufacture.

In some embodiments, the spherical central lens comprises a material having a low refractive index and a high Abbe number. In some embodiments, the refractive index of the central lens material is within the range of approximately 1.28 to approximately 1.52. In some embodiments, the Abbe number of the central lens material is within the range of approximately 73 to approximately 96. In some embodiments, the central lens material is calcium fluoride.

An illustrative embodiment of the present invention comprises a monocentric objective lens, a plurality of secondary lenses, and plurality of sensors. The monocentric lens includes a substantially spherical central element and a plurality of spherically shaped shell elements, wherein the central element and shell elements are concentric. The central element comprises calcium fluoride, which provides a positive focusing power for the lens. In addition, calcium fluoride is characterized by low chromatic dispersion, which facilitates correction of chromatic aberration. Each of the shell elements comprises a glass having an Abbe number that is lower than the Abbe number of the central element. The inclusion of the shell elements in the objective lens enables a reduction in the magnitude of both chromatic and spherical aberrations in the output of the lens. In some embodiments, an air gap is included between two of the shell elements, which facilitates simultaneous correction of chromatic and spherical aberration without introducing significant dispersion.

In some embodiments, each secondary lens is paired with a different sensor array to collectively define one of a plurality of substantially identical sub-imaging units. The sub-imaging units collectively provide a composite digital representation of the scene. In some embodiments, the sub-imaging units are arranged such that each image point is received by at least two secondary lenses so that the plurality of secondary lenses collectively provides an image of the scene that is substantially free of blind spots.

An embodiment of the present invention comprises an optical system for providing an image of a scene, the optical system comprising: (1) a first lens comprising; (a) a first lens element that is substantially a sphere having a center at a first position, wherein the first lens element imparts a first aberration with a first magnitude on light that transits the first lens element; (b) an entry lens shell having a substantially uniform thickness and a center of curvature at the first position; and (c) an exit lens shell having a substantially uniform thickness and a center of curvature at the first position; wherein the first lens element, the entry lens shell, and the exit lens shell collectively impart the first aberration with a second magnitude on light that propagates through the first lens, and wherein the second magnitude is less than the first magnitude; and (2) a plurality of second lenses that collectively image the scene through the first lens, wherein each of the plurality of second lenses has a unique optical axis.

BRIEF DESCRIPTION OF THE DRAWINGS

FIG. 9A depicts a modulation transfer function curve for a multi-scale optical system in accordance with first alternative embodiment.

FIG. 9B-E depict spot size diagrams for an optical system comprising objective lens 700 and camera 800 at a sensor array 810.

DETAILED DESCRIPTION

Figure 1:
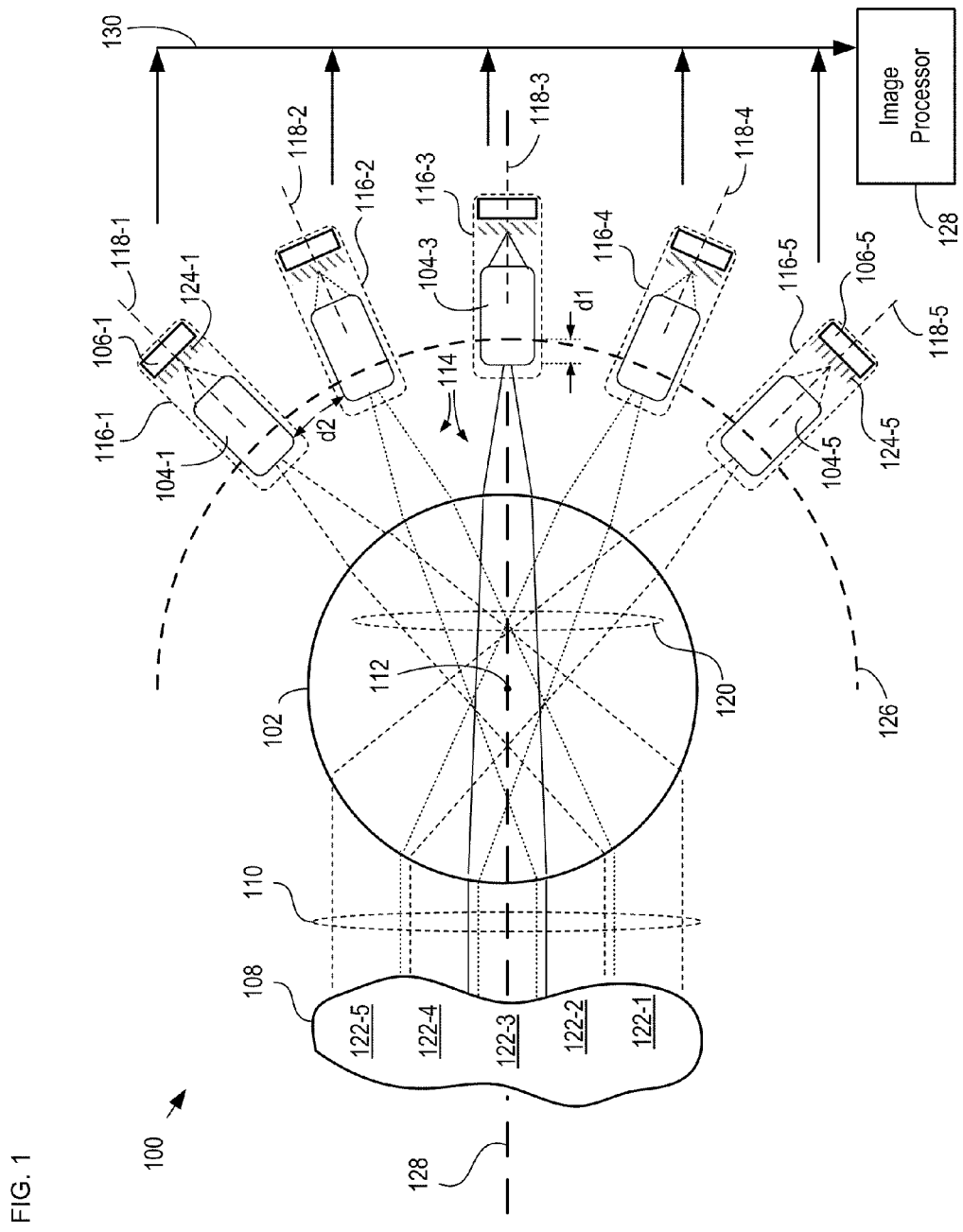
FIG. 1 depicts a schematic drawing of a multi-scale optical system in accordance with an illustrative embodiment of the present invention.

The following terms are defined for use in this Specification, including the appended claims:

Spherical is defined being characterized by (1) a common center of curvature and (2) a uniform radius of curvature. A spherical surface, for example, is a surface that has substantially the same shape as at least a portion of a sphere.

Apochromatic is defined as focusing three or more wavelengths at substantially the same focal distance or image field.

This invention is a continuation-in-part of parent case U.S. patent application Ser. No. 12/651,894 filed 4 Jan. 2010, entitled "Multi-scale Optical System."

As disclosed in the parent case, a multi-scale optical system comprises a single objective lens and an array of small secondary lenses. The objective lens and the secondary lenses collectively image a scene onto a plurality of sensor arrays, such as photodetector arrays, as a plurality of optical sub-images. Each secondary lens has a unique optical axis and images a portion of the scene through the objective lens to produce one of the optical sub-images. The sensor arrays convert the plurality of optical sub-images into digital representations (i.e., digital images) of portions of the scene. The plurality of digital images can then be combined to form a composite digital image of the entire scene.

The multi-scale imaging approach affords significant advantages over other imaging approaches. First, in a multi-scale imaging system, the objective lens and secondary lenses split the task of imaging the scene. Light collection is done at the objective lens, which forms an aberrated image at an image region. The secondary lenses are placed around this image region and each secondary lens relays a portion of the aberrated image to form its optical sub-image at its corresponding planar sensor array. In addition to relaying a portion of the aberrated image, each secondary lens processes the light by at least partially correcting its relayed portion of the aberrated image (i.e., reduces the magnitude of at least one aberration). This separation enables each of the collecting and processing functions to be individually improved without significantly comprising the design of the other. It also enables a large-scale objective lens to be used with a large-count multi-aperture array, thereby reducing the trade-off between geometric aberration and field-of-view.

As discussed in the parent application to this case, U.S. patent application Ser. No. 12/651,894, which is incorporated herein by reference, prior-art imaging systems have been demonstrated that include secondary lenses that provide a degree of compensation for field curvature. Such prior-art imaging systems include, for example, those disclosed by J. A. Cox, et al., in U.S. Pat. No. 6,556,349, issued Apr. 29, 2003. Field curvature, however, is a global aberration. For the purpose of this Specification, including the appended claims, a "global aberration" is defined as an aberration that extends, in slowly varying fashion, across multiple optical fields. A "localized aberration" is defined as an aberration, or a portion of a global aberration, that is substantially unique to an individual optical field. For example, a plurality of localized aberrations might collectively define a global aberration; however, the magnitude of wavefront distortion associated with each localized aberration is substantially unique to its associated individual optical field.

Second, the secondary lenses can include a degree of wavefront correction to correct aberrations introduced by the large-scale objective lens. This reduces the design complexity required for the objective lens. This also enables faster collection optics, which reduces overall system volume.

Third, multi-scale imaging is capable of improved image resolution.

Fourth, manufacturing cost and complexity can be significantly lower for a multi-scale imaging system. Smaller lenses are better at providing wavefront correction because: 1) wavefront correction and image formation both yield geometric solutions with less wavelength-scale error over smaller apertures; and 2) manufacturing of complex lens surfaces is much easier in smaller scale systems.

Fifth, in some multi-scale imaging systems, the secondary lenses are designed to focus at diverse ranges with overlapping fields. This enables tomographic object reconstruction by combining multi-scale imaging with multi-dimensional image capture, such as, for example, in a TOMBO-based system (Thin Observation Module by Bound Optics).

Finally, multi-scale design enables the use of multiple discrete focal plane arrays. As a result, the discrete focal plane arrays can be arranged in any advantageous manner, including non-planar arrangements—for example, an arrangement that matches the shape of the image field of the objective lens. Further, the size of the focal plane arrays can be selected at a granularity that reduces fabrication cost and increases overall reliability. Still further, the sub-images from the plurality of focal plane arrays can be collectively synthesized into a spatially correlated image of a scene without the stitching and field uniformity issues found in prior-art imaging systems. And still further, the complexity of the post-processing required to synthesize the full-scene image is significantly lower for embodiments of the present invention than the computational post-processing required in prior-art imaging systems, such as a TOMBO-based system.

The present invention enables an improved multi-scale optical system by employing a monocentric lens as the objective lens. Monocentric lenses in accordance with the present invention include a central spherical lens element that interposes an entry lens shell and an exit lens shell.

FIG. 1 depicts a schematic drawing of a multi-scale optical system in accordance with an illustrative embodiment of the present invention. System 100 comprises objective lens 102, secondary lenses 104-1 through 104-5, and sensor arrays 106-1 through 106-5.

Figure 2:
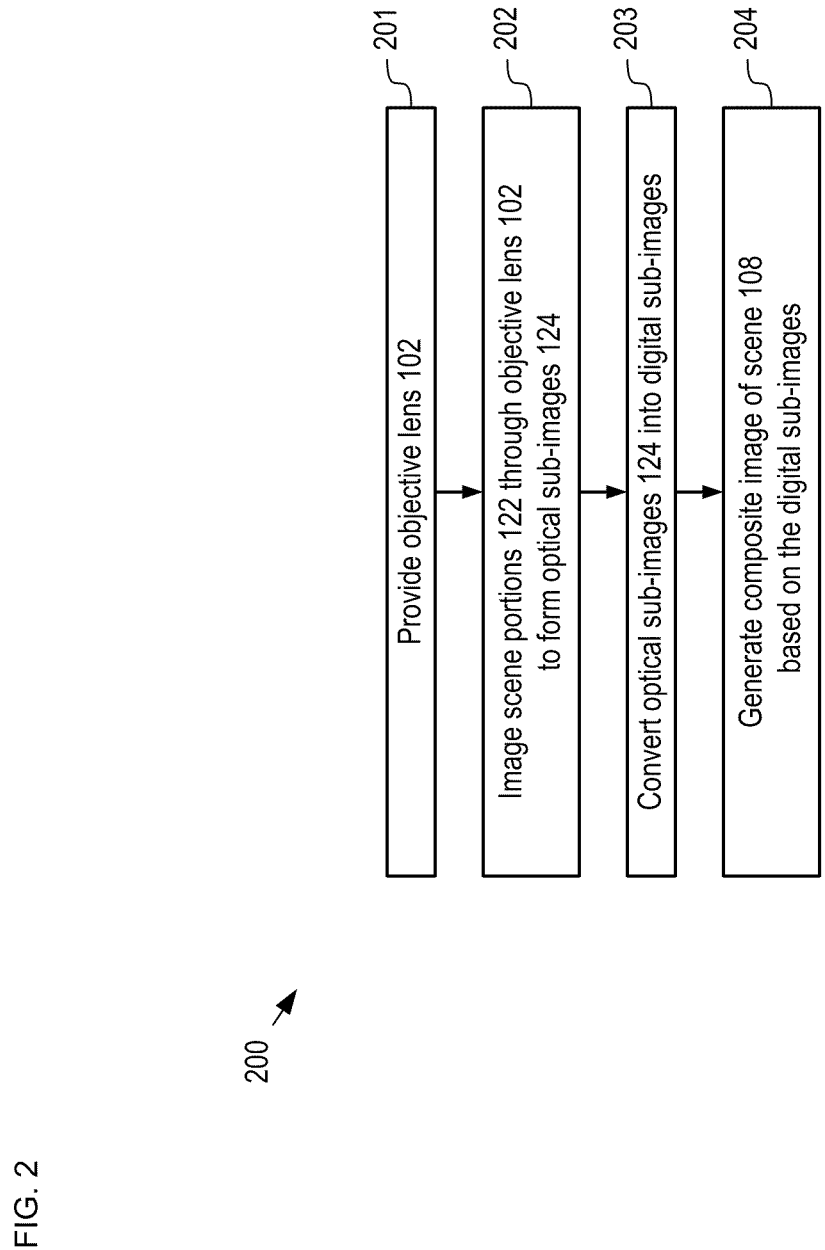
FIG. 2 depicts operations of a method suitable for providing an image in accordance with the illustrative embodiment of the present invention.

FIG. 2 depicts operations of a method suitable for providing an image in accordance with the illustrative embodiment of the present invention. Method 200 begins with operation 201, wherein objective lens 102 is provided.

Objective lens 102 is a monocentric lens suitable for collecting a sufficient amount of light 110 received from scene 108. All optical surfaces of objective lens 102 have a center of curvature located at center point 112.

A monocentric lens is a lens wherein all surfaces of the lens share a common center of curvature. Monocentric lenses identically focus light coming from any direction. This enables a monocentric lens to be used for very wide-field viewing. The image formed is spherically shaped rather than plane-shaped, and has unit angular magnification. Because of the symmetry of a monocentric lens, aberrations introduced by the lens are independent of the field point. As a result, a monocentric lens introduces significant amounts of only spherical aberration into light that passes through the lens (neglecting image curvature and image distortion). The introduced aberrations are substantially limited to spherical aberration because it is the only aberration that is independent of field point.

An example of a monocentric lens found in the prior art is the "Luneberg lens," which is described in Luneburg, R. K.

(1944) *Mathematical Theory of Optics*, Providence, R.I.: Brown University: pp. 189-213; Morgan, S. P. (1958) *Journal of Applied Physics* 29: pp. 1358-1368; and Doric, S. Munro, E. (1983) *Journal of the Optical Society of America* 73: pp. 1083-1086; and Southwell, W. H. (1977) *Journal of the Optical Society of America* 67: pp. 1010-1014. The Luneburg Lens comprises a spherically shaped, gradient-index lens that forms images of objects on its surface. The Luneburg lens has been fabricated for operation at microwave frequencies. The Luneburg lens is unsuitable for optical wavelengths, however, for several reasons. First, the Luneburg lens uses graded refractive indices from 1 to √2. Excluding exotic meta-materials, glasses are not available within this range of refractive indices. Second, practical gradient-index lenses are difficult to fabricate. Third, gradient-index lenses suffer from severe chromatic aberration and therefore are unsuitable for imaging with broadband light.

In contrast to the Luneburg lens, objective lenses in accordance with the present invention comprise a layered structure that:

i. achieve nearly diffraction-limited performance; or
ii. have a large field-of-view; or
iii. are apochromatic within the wavelength range from approximately 450 nanometers (nm) to approximately 700 nm; or
iv. mitigate chromatic and/or spherical aberration; or
v. are capable of resolving greater than $10^9$ spots; or
vi. are practical to fabricate; or
vii. any combination of i, ii, iii, iv, v, and vi.

Figure 3:
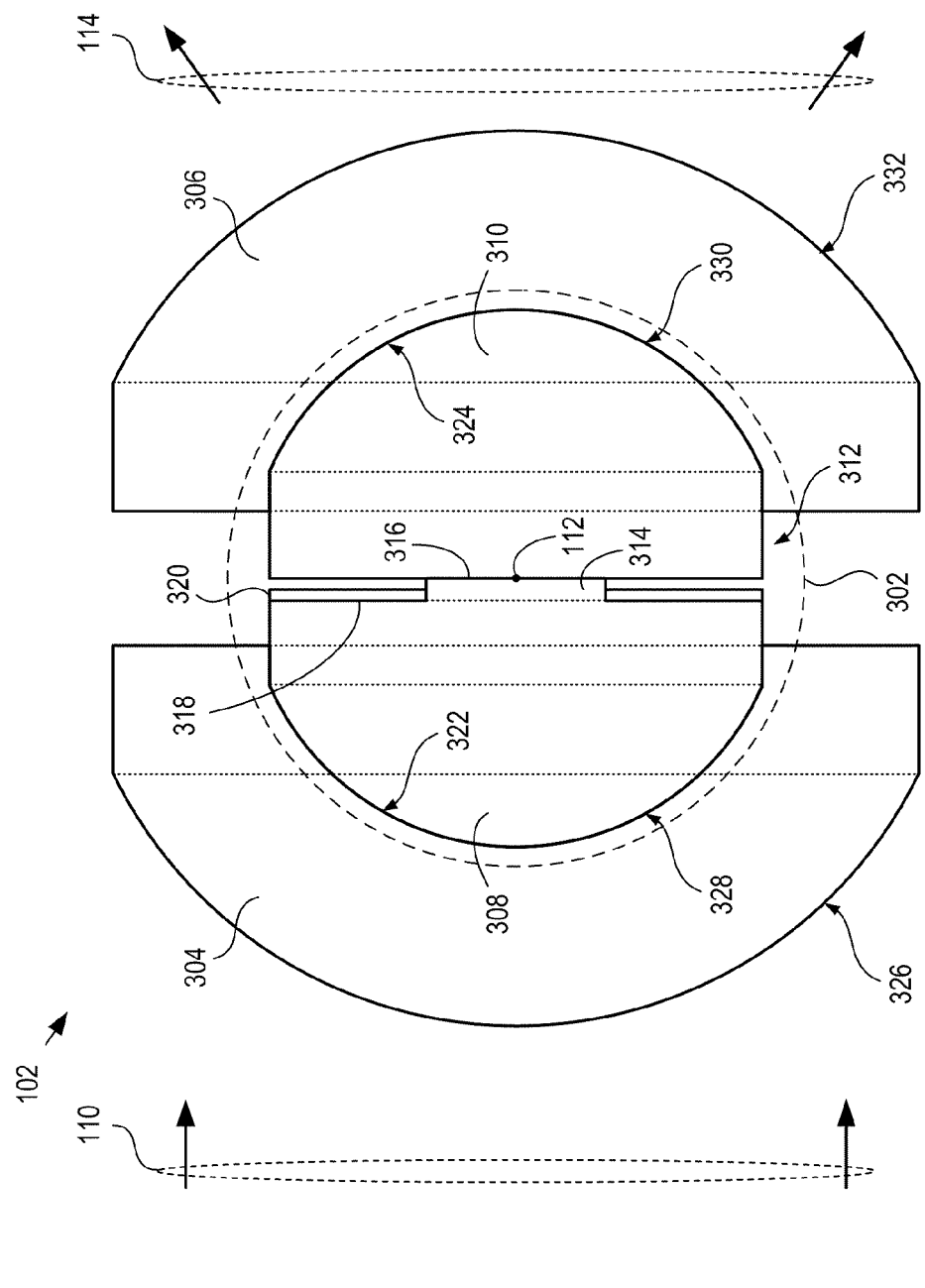
FIG. 3 depicts a schematic drawing of a cross-sectional view of an objective lens in accordance with the illustrative embodiment of the present invention.

FIG. 3 depicts a schematic drawing of a cross-sectional view of an objective lens in accordance with the illustrative embodiment of the present invention. Objective lens 102 is a multi-element monocentric lens comprising lens element 302, entry lens shell 304, and exit lens shell 306. FIG. 3 is described herein with continuing reference to FIGS. 1 and 2.

Lens element 302 comprises hemispheres 308 and 310. Each of hemispheres 308 and 310 comprise calcium fluoride. As a result, lens element 302 is characterized by a refractive index of approximately 1.433848 and an Abbe number of approximately 95.232905. Calcium fluoride is characterized by low chromatic dispersion; therefore, use of calcium fluoride in lens element 302 facilitates chromatic aberration correction in multi-scale optical system 100. Although calcium fluoride is a preferred material for lens element 302, in some embodiments, lens element 302 comprises a different material having a refractive index within the range of approximately 1.28 to approximately 1.52. Materials suitable for use in lens element 302 include, without limitation, calcium fluoride, fused silica, BK-7 glass, SK-7 glass, fluorocrown glass, magnesium fluoride, plastics, water, and perfluorooctane. In some embodiments, the material of lens element 302 is selected such that it's refractive index is lower than the refractive index of the materials of each of entry lens shell 304 and exit lens shell 306 and, further, such that its Abbe number is higher than the Abbe number of the materials of each of entry lens shell 304 and exit lens shell 306.

Hemispheres 308 and 310 are joined at a central plane comprising center point 112 to collectively define a shape that is substantially a sphere having a diameter of approximately 164.5 millimeters (mm). It should be noted that, in some embodiments, lens element 302 comprises optional flat region 312 to facilitate its mounting. In some embodiments, hemispheres 308 and 310 are sculpted so that they substantially include only those portions of spherical surfaces 322 and 324 that interact with the light that transits the lens element 302.

Although in the illustrative embodiment the curved surfaces of hemispheres 308 and 310 have substantially the same radius of curvature, it will be clear to one skilled in the art, after reading this Specification, how to specify, make, and use alternative embodiments of the present invention wherein the radius of curvature of the curved surface of hemisphere 308 is different than the radius of curvature of the curved surface of hemisphere 310.

Hemisphere 308 comprises pedestal 314. Pedestal 314 is typically formed by grinding back or etching surface 316 of hemisphere 308 outside the region of the pedestal to form relieved surface 318. Relieved surface 318 is then coated with layer 320 so that pedestal 314 and layer 320 collectively define an optical stop in the interior of lens 102. Layer 320 is a layer of opaque or absorbing material disposed on relieved surface 318 in conventional fashion. In some embodiments, the process used to form relieved surface 318 leaves the surface sufficiently opaque to obviate layer 320.

When hemispheres 308 and 310 are joined to form lens element 302, surface 316 of hemisphere 308 and surface 322 of hemisphere 310 collectively form a substantially continuous region of lens material. As a result, surfaces 316 and 322 do not constitute optical surfaces for the purpose of this description, since light that passes through them does not see a material change.

It should be noted that, although the spherical shape of lens element 302 mitigates introduction of many aberrations on light 120 as it transits the lens element, lens element introduces some spherical aberration and chromatic aberration onto light 120. It is an aspect of the present invention, however, that by employing properly designed lens shells at the entry and exit points of lens element 302, the magnitude of one or both of spherical and chromatic aberration introduced by lens element 302 is reduced.

Entry lens shell 304 is a curved shell section having a substantially spherical shape. In other words, entry lens shell 304 is a portion of a spherical shell. Entry lens shell 304 comprises flint glass (e.g., LASF46A) that is characterized by a refractive index of approximately 1.903660 and an Abbe number of approximately 31.39976. Entry lens shell 304 has a substantially uniform thickness between spherical surfaces 326 and 328 of approximately 48.163 mm.

Exit lens shell 306 is a curved shell section having a substantially spherical shape. In other words, exit lens shell 306 is a portion of a spherical shell. Exit lens shell 306 comprises flint glass (e.g., BAF50) that is characterized by a refractive index of approximately 1.6827260 and an Abbe number of approximately 44.503507. Exit lens shell 306 has a substantially uniform thickness between spherical surfaces 330 and 332 of approximately 54.344 mm.

Objective lens 102 is designed to be substantially achromatic for wavelengths within the range of approximately 500 nm to approximately 600 nm. It has an effective aperture size of approximately 100 mm. In some embodiments, the aperture size of objective lens 102 is within the range of approximately 50 mm to approximately 200 mm; however, it will be clear to one skilled in the art, after reading this specification, how to specify, make, and use an objective lens having any practical aperture size.

Further, one skilled in the art will recognize that the specific design parameters (e.g., materials, radius of curvature, thickness, refractive index, Abbe number, etc.) provided for the elements of objective lens 102 provide only one potential combination of design parameters that define a suitable lens design. For example, one skilled in the art will recognize that the material choices made for the elements of lens 102 could include any of, for example and without limitation, calcium fluoride, fused silica, BK-7 glass, SK-7 glass, fluorocrown glass, magnesium fluoride, or plastics. It will be clear, therefore, after reading this Specification, that objective lenses with reduced spherical aberration and/or reduced chromatic aberration and/or apochromaticism can be achieved with different design parameters.

Still further, one skilled in the art will recognize that, although objective lens 102 comprises only refractive surfaces, a monocentric lens in accordance with the present invention can include reflective surfaces (e.g., a catadioptric lens).

Table 1 below summarizes the design parameters for objective lens 102.

TABLE 1

Design parameters for a representative monocentric objective lens.

| Radius (mm) | Thickness (mm) | Glass (Schott catalog) | Semi-Diameter (mm) | Conic K | Comments |
|---|---|---|---|---|---|
| 135.000 | 48.163 | LASF46A (n = 1.903660, V = 31.39976) | 128.990 | | Objective entrance surface |
| 86.737 | 86.837 | CAF2 (n = 1.433848, V = 95.232905) | 84.472 | | Internal CAF2 sphere |
| Infinity | 86.837 | CAF2 (n = 1.433848, V = 95.232905) | 45.551 | | Objective stop position |
| −86.837 | 54.344 | BAF50 (n = 1.682726, V = 44.503507) | 82.251 | | |
| −141.181 | 158.819 | Air | 129.673 | | Objective exit surface |

The inclusion and design of entry lens shell 304 and exit lens shell 306 in objective lens 102 enables entry lens shell 304, lens element 302, and exit lens shell 306 to collectively reduce the magnitude of each of spherical aberration and chromatic aberration from the magnitude of these aberrations introduced by lens element 302 individually.

In addition, the spherical symmetry of optical surfaces 326, 328, 322, 324, 330, and 332 results in lens 102 introducing only field-independent aberrations into light 114. The primary source of aberration introduced by a spherically symmetric lens, such as lens 102, arises from the refraction of light rays as they enter the front surface (i.e., optical surface 326) from free space. It is an aspect of the present invention that the layers of lens 102 are designed so that the collective refraction introduced at the rest of the optical surfaces (i.e., optical surfaces 328, 322, 324, 330, and 332) produce negative spherical aberration that, at least partially, offsets positive spherical aberration introduced at optical surface 326.

Further, although entry lens shell 304 and exit lens shell 306 are spherically symmetric, they comprise different materials and/or shell thickness. This enables aberration correction to be achieved with fewer surfaces.

Lens 102 forms an aberrated image of scene 108 at spherically shaped image field 126.

At operation 202, each of secondary lenses 104 images one of scene portions 122-1 through 122-5 through objective lens 102. Each of secondary lenses 104 is paired with one of sensor arrays 106-1 through 106-5 (referred to, collectively, as sensor arrays 106) to collectively define one of cameras 116-1 though 116-5 (referred to, collectively, as cameras 116). For example, secondary lens 104-2 and sensor array 106-2 collectively define camera 116-2.

Each of secondary lenses 104 produces one of optical sub-images 124-1 through 124-5 (referred to, collectively, as optical sub-images 124) at its corresponding sensor array 106. For example, secondary lens 104-3 images scene portion 122-3 through objective lens 102 and forms optical sub-image 124-3 at sensor array 106-3.

Cameras 116 are arranged in a substantially spherical arrangement having a center of curvature at center point 112. As a result, secondary lenses 104 and sensor arrays 106 are also arranged in substantially spherical arrangements whose centers of curvature are center point 112. Each camera 116 has a unique optical axis 118 that passes through the center of its secondary lens 104 and sensor array 106.

Secondary lenses 104 are arranged in an arrangement that is substantially spherical and has a center of curvature substantially located at center point 112. Each of secondary lenses 104 is displaced from image field 126 by distance d1. In addition, each of secondary lenses 104 is separated from nearest neighbors by distance d2. Distances d1 and d2 are selected to enable light rays from each image point in scene 108 to be captured by at least one secondary lens 104. As a result, the inclusion of blind spots in a composite image collectively formed by sensor arrays 106 is mitigated.

In some embodiments, secondary lenses 104 are arranged in a spherical arrangement wherein each of secondary lenses 104 is not displaced from image field 126. In some embodiments, each of secondary lenses 104 is located further to center point 112 than image field 126.

Figure 4:
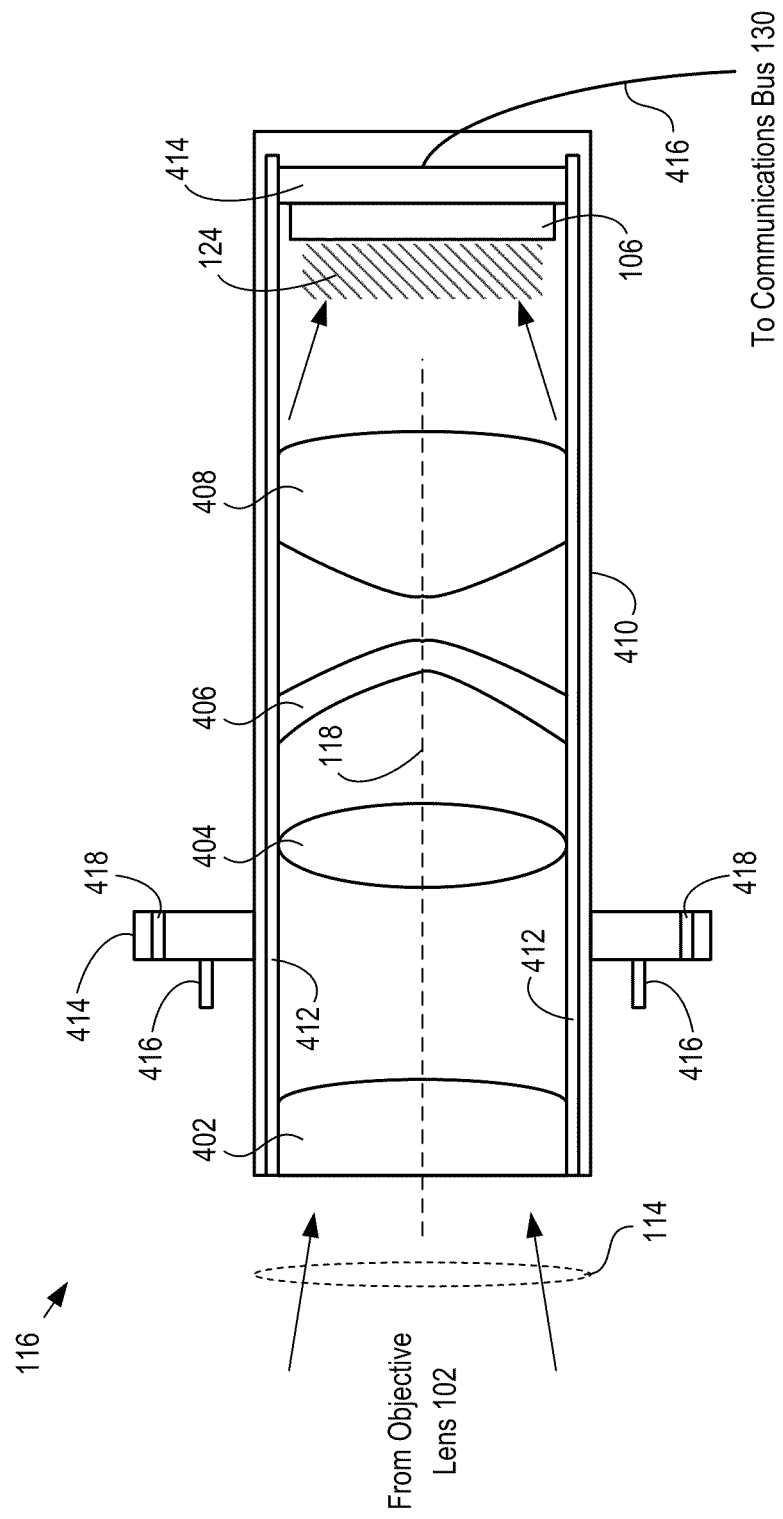
FIG. 4 depicts schematic drawing of a cross-sectional view of a camera in accordance with the illustrative embodiment of the present invention.

FIG. 4 depicts schematic drawing of a cross-sectional view of a camera in accordance with the illustrative embodiment of the present invention. Camera 116 comprises secondary lens 104, which comprises lens elements 402, 404, 406, and 408. Secondary lens 104 is designed to provide an optical sub-image 124 having a diameter within the range of approximately 3 mm to approximately 4 mm.

Because objective lens 102 is a monocentric lens, it produces substantially the same aberrations for all imaged points. In addition, due to its monocentric nature, objective lens 102 produces little or no off-axis aberrations, such as coma or astigmatism, which would require individual correction by different secondary lenses located at different distances off optical axis 128 of imaging system 100.

As a result, the same prescription can be used for each secondary lens 104 without regard for the angle of incoming light into objective lens 102. This affords embodiments of the present invention with significant advantages. In particular, the fabrication cost for the secondary lenses is dramatically reduced since the same lens design can simply be replicated. Further, packaging complexity is reduced since the same packaging methodology can be used to align and secure each of secondary lenses 104. Still further, identical cameras 116 can be produced in volume at lower cost.

Secondary lens 104 is an axially symmetric combination of lens elements. As a result, secondary lens 104 introduces off-axis aberrations to light 114. Since secondary lens 104 is relatively small, however, fewer lens elements are required to correct the induced off-axis aberrations than would be required of an axially symmetric lens the size of the objective lens. In addition, in some embodiments, the design of secondary lens 102 includes aspheric surfaces, which enables the secondary lens to achieve good relay optical performance with fewer lens elements. The use of few lens elements reduces overall system weight, system complexity, and cost.

In some embodiments, the lens elements included in secondary lens 104 are amenable to mass production, such as plastic molding or glass molding. As discussed above, these advantages are afforded by the use of a multi-scale optical system design, which enables a trade-off between simplicity in the objective lens design vs. complexity of the secondary lens design. Complexity is better included in the secondary lens design since it is easier and cheaper to fabricate small complex optics than large complex optics.

Table 2 below summarizes the design parameters for secondary lens 104.

TABLE 2

Design parameters for a representative secondary lens.

| Radius (mm) | Thickness (mm) | Glass (Schott catalog) | Semi-Diameter (mm) | Conic K | Comments |
|---|---|---|---|---|---|
| Infinity | 2.118 | F2 (n = 1.620040, V = 36.366491) | 5.000 | | Start of secondary lens |
| −29.950 | 26.713 | Air | 5.000 | 7.569 | |
| 10.689 | 2.917 | FK51 (n = 1.486561, V = 84.467994) | 5.000 | −1.491 | |
| −6.724 | 5.009 | Air | 5.000 | −3.189 | |
| −1.661 | 1.895 | F2 (n = 1.620040, V = 36.366491) | 5.000 | −1.967 | Secondary lens stop position |
| −3.944 | 1.093 | Air | 5.000 | −2.893 | |
| 3.402 | 6.572 | FK51 (n = 1.486561, V = 84.467994) | 5.000 | −2.893 | |
| −12.748 | 5.000 | Air | 5.000 | −7.770 | End of secondary lens |
| Infinity | — | Image Plane | 1.717 | | Image Plane |

Lens element 402 is a plano-convex lens having a diameter of approximately 10 mm. Lens element 402 comprises glass having a relatively high refractive index of approximately 1.6200040 and a relatively low Abbe number of approximately 36.366491.

Lens element 404 is a convex-convex lens having a diameter of approximately 10 mm. Lens element 404 comprises glass having a refractive index of approximately 1.486561 and an Abbe number of approximately 84.467994.

Lens element 406 is a concave-convex lens having a diameter of approximately 10 mm. Lens element 406 comprises the same glass used in lens element 402.

Lens element 408 is a convex-convex lens having a diameter of approximately 10 mm. Lens element 408 comprises the same glass used in lens element 404.

Housing 410 is a tube that comprises a material having a low thermal-expansion coefficient. Materials suitable for use in housing 410 include, without limitation, Invar, super Invar, titanium, Zerodur, fused silica, composite materials, and the like.

Housing 410 aligns and holds lens elements 402, 404, 406, and 408 via precision rails 412. Precision rails are micromachined silicon rails that separate the lens elements by air gaps as shown in Table 2. In some embodiments, precision rails are conventionally fabricated rails that comprise a material having a low thermal-expansion coefficient. Collectively, lens elements 402, 404, 406, and 408 enable a secondary lens that images a field-of-view of approximately 1.6 degrees.

Housing 410 also comprises flange 414, which includes pins 416 and slots 418. Pins 416 and slots 418 facilitate alignment of housing 410 with receptor 604, as described below and with respect to FIGS. 6A and 6B.

At operation 203, each of sensor arrays 106 converts a received optical sub-image into a digital image of a scene portion 122.

Each of sensor arrays 106 comprises a two-dimensional arrangement of 10 million charge-coupled device (CCD) elements 502 having a size of approximately 1.5 microns. As a result, each camera 116 is capable of providing 10 million individual electrical signals that are based on the intensity of light from 10 million image points in scene 108. In other words, each camera 116 is a 10-megapixel camera. The total size of sensor array 106 is suitable for completely sampling an optical sub-image having a diameter within the range of approximately 3 mm to approximately 4 mm.

In some embodiments of the present invention, each of sensor arrays comprises a two-dimensional arrangement of another photosensitive device, such as a CMOS sensor, photodetector, avalanche photodiode, and the like. It will be clear to one skilled in the art how to specify, make, and use sensor arrays 106.

Each of sensor arrays 106 is electrically coupled with image processor 128 via communications bus 120. Image processor 128 is a conventional image processing system that receives electrical signals from each of elements 502 and forms digital sub-images based on optical sub-images 124.

At operation 204, image processor 128 forms a composite digital image of scene 108 based on the plurality of digital sub-images.

In some embodiments, each of cameras 116 further comprises an automatic focusing mechanism. In some embodiments, autofocus is performed by a helical focusing arrangement or by translating sensor array 106 along the optical axis 118 of the camera. Autofocus capability enables some embodiments of the present invention to focus different portions of scene 108 at different depths.

In some embodiments, each of cameras 116 comprises an optical filter, such as a polarization or color filter. As a result, such embodiments comprise a capability for analyzing a portion of scene 108 by examining the polarization and/or spectral signature of that portion.

In the illustrative embodiment, secondary lenses 104 are relied upon to correct residual spherical aberration introduced by objective lens 102. In addition, secondary lenses 104 correct curvature-of-field of image field 126 to enable formation of optical sub-images at the flat sensor arrays 106. Further, in the illustrative embodiment, secondary lenses 104 reduce the scale of the image provided by objective lens 102 in order to accommodate gaps between sensor arrays 106.

Figure 5A:
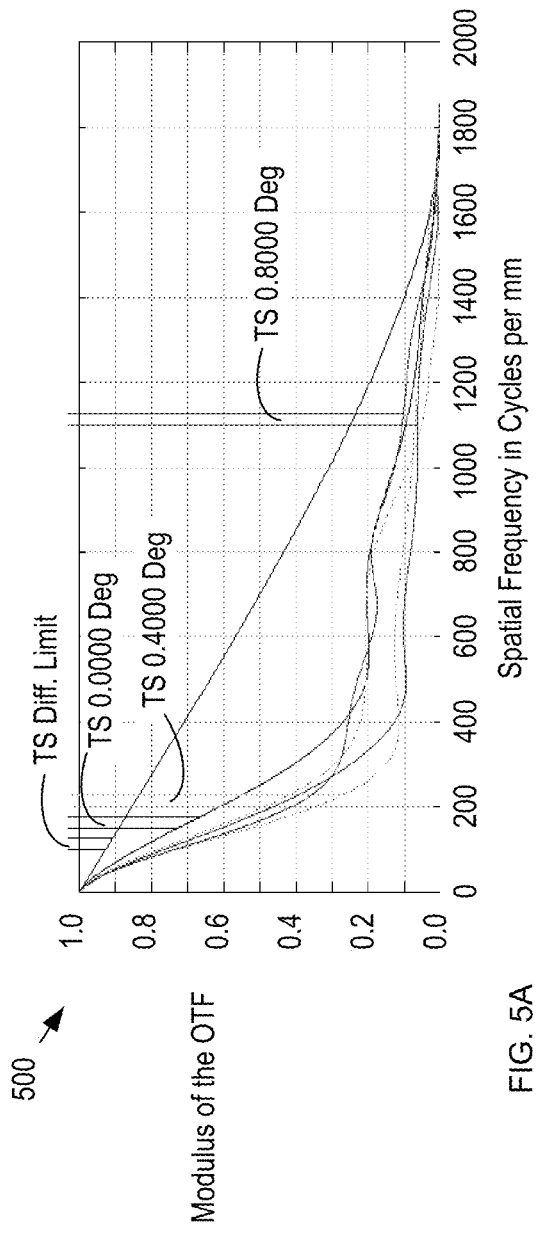
FIG. 5A depicts a modulation transfer function curve for a multi-scale optical system in accordance with the illustrative embodiment.

FIG. 5A depicts a modulation transfer function curve for a multi-scale optical system in accordance with the illustrative embodiment. Plot 500 depicts the modulation transfer function (MTF) curve for system 100 at a sensor array 106.

Figure 5B:
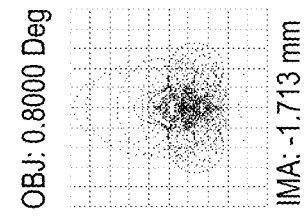
FIG. 5B-D depict spot size diagrams for system 100 at the surface of a sensor array 106.
Figure 5C:
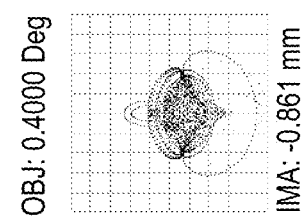
Figure 5D:
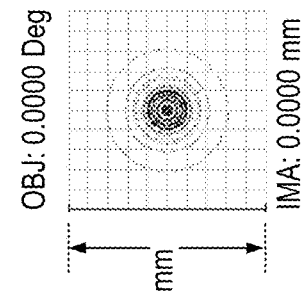

FIG. 5B-D depict spot size diagrams for system 100 at the surface of a sensor array 106.

Figure 6B:
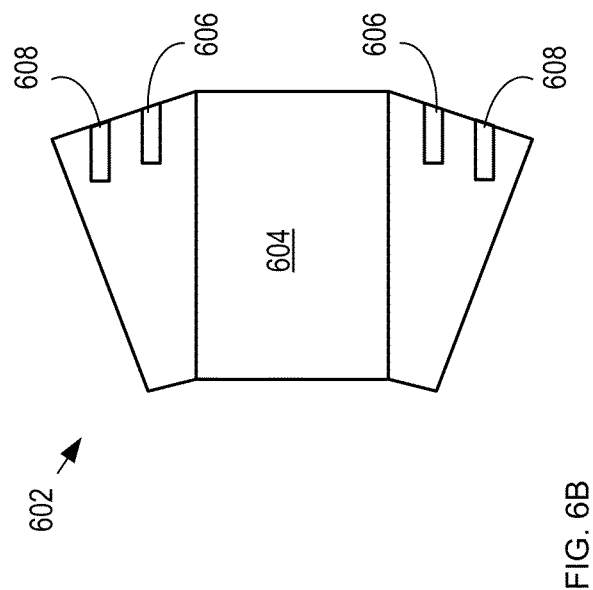
FIG. 6B depicts a receptor for receiving a camera in accordance with the illustrative embodiment of the present invention.
Figure 6A:
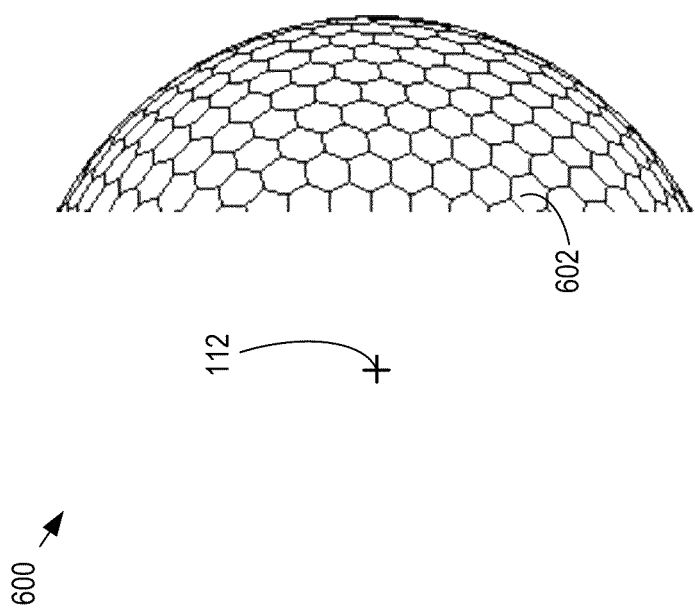
FIG. 6A depicts a schematic drawing of a side-view of a frame for holding a spherical arrangement of cameras in accordance with the illustrative embodiment of the present invention.

FIG. 6A depicts a schematic drawing of a side-view of a frame for holding a spherical arrangement of cameras in accordance with the illustrative embodiment of the present invention.

Frame 600 is a substantially spherically shaped support that comprises 5000 receptors 602 and 604 for mounting 5000 cameras 116. Frame 600 is analogous to a portion of geodesic sphere dual, wherein the surface of frame 600 is partitioned into hexagonal cells (i.e., receptors 602) and a relatively smaller number (typically ≤12) of pentagonal cells (i.e., receptors 604). While it is desirable to partition the sphere into faces as uniform as possible, a sphere with greater than 20 faces cannot be tiled into completely uniform faces. This tiling of the surface of frame 600 into receptors 602 and 604 results in a nearly uniform spacing of cameras 116, however.

Frame 600 has a radius of approximately 300 mm and a center of curvature located at center point 112. In some embodiments, frame 600 comprises a low-thermal-expansion material, such as Invar, super Invar, titanium, Zerodur, fused silica, composite materials, and the like. In some embodiments, frame 600 comprises a material whose coefficient of thermal expansion is substantially matched to the material of housing 410.

Frame 600 comprises 4988 hexagonal receptors 602 and 12 pentagonal receptors 604. When receptors 602 and 604 are fully populated with cameras 116, therefore, system 100 is capable of imaging 50 billion pixels. In some embodiments, the relative number of receptors 602 and 604 is other than 4988 to 12. In some embodiments, the total number of receptors is other than 5000.

Although in the illustrative embodiment frame 600 predominantly comprises hexagonally shaped receptors, it will be clear to one skilled in the art, after reading this Specification, how to specify, make, and use alternative embodiments of the present invention wherein frame 600 comprises a different arrangement of receptors having shapes other than hexagons. For example, in some alternative embodiments, frame 600 is an icosadeltahedral solid that comprises receptors having the shape of a substantially equilateral triangle. Some other examples of suitable configurations for frame 600 are disclosed by H. Kenner in "Geodesic Math and How to Use it," published by University of California Press (1976), which is incorporated by reference herein.

FIG. 6B depicts a receptor for receiving a camera in accordance with the illustrative embodiment of the present invention. Receptor 602 comprises through-hole 604, channel 606, and threaded holes 608. Receptor 604 is analogous to receptor 602.

Through-hole 604 is dimensioned and arranged to receive housing 410 of camera 116 such that its optical axis 118 is substantially aligned with center point 112. Each receptor comprises a through-hole into which housing 410 is inserted. Housing 410 is moved laterally in through-hole 604 until optical sub-image 124 is properly focused. Once housing 410 is in place, its position in through-hole 604 is fixed via set screws, UV-curable epoxy, thermo-set epoxy, or other conventional method. In some embodiments, each receptor 602 has a cross-sectional area of approximately 48.2 $mm^2$.

Rotational alignment of sensor array 106 established by rotating housing 410 about optical axis 118. Once sensor array 106 is rotationally aligned, its position is fixed via screws inserted through holes 418 that mate with threaded holes 608.

Pins 416 mate with channel 606 to center sensor array 106 on optical axis 118.

Frame 600, receptors 602, and housings 410 collectively enable an arrangement of the cameras 116 that generates a mosaic of sub-images of scene 108. By virtue of this mosaic arrangement, embodiments of the present invention are afforded with several advantages over imaging systems of the prior art. First, such an arrangement enables overlapping fields-of-view to be used, which relieves a significant constraint for prior-art imaging systems wherein the focal plane array that receives an image of a scene must comprise photodetectors that are immediately adjacent to one another. As a consequence, each of sensor arrays 106 can be sized to optimize cost, yield, etc. Further, such an arrangement also enables the use of detector arrays that are different sizes, if desired. Still further, detector arrays 106 can be spaced to allow for the inclusion of electronics between them. Finally, by forming a mosaic of sub-images, multiple-aperture cameras that jointly optimize physical filtering, sampling, and digital processing of the resultant images can be used.

It should be noted that the arrangement of cameras depicted in FIG. 1 shows secondary lenses 104 (and sensor arrays 106) that are quite widely spaced apart from one another. The large spacing is merely for the purposes of clarity. One skilled in the art will recognize, after reading this Specification, that practical arrangements of secondary lenses 104 will typically include more secondary lenses that are spaced more closely. In some embodiments, for example, each secondary lens 104 images a field-of-view within the range of approximately 1 degree to approximately 5 degrees. As a result, hundreds of secondary lenses and sensor arrays would be required to provide an image having a 120-degree included angle. One skilled in the art will recognize, after reading this Specification, that the field-of-view imaged by each secondary lens and the total field-of-view of system 100 are matters of design and can have any practical value.

Figure 7:
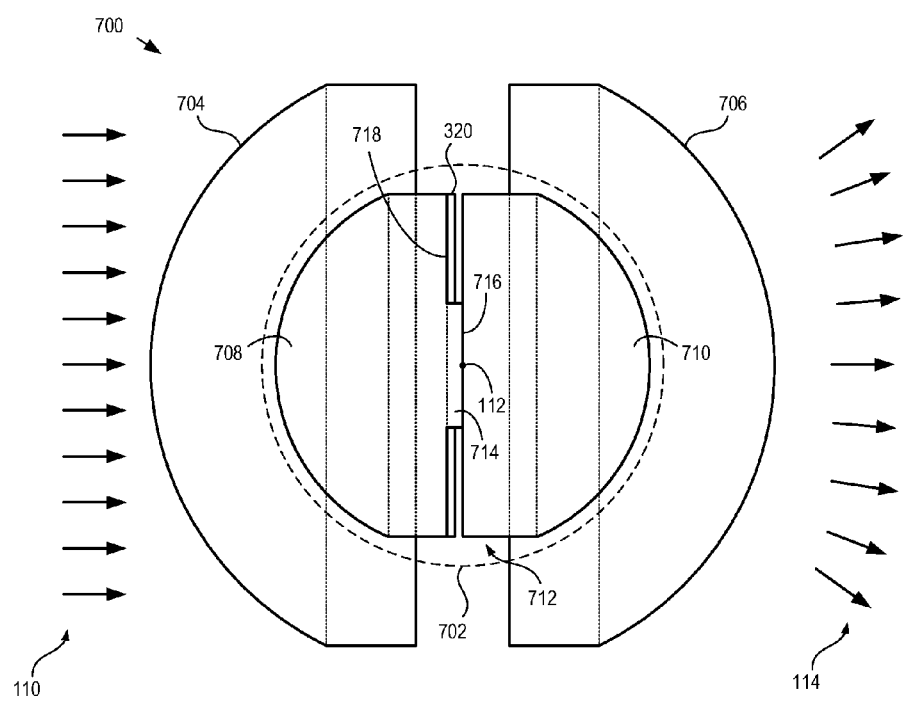
FIG. 7 depicts a schematic drawing of a cross-sectional view of an objective lens in accordance with a first alternative embodiment of the present invention.

FIG. 7 depicts a schematic drawing of a cross-sectional view of an objective lens in accordance with a first alternative embodiment of the present invention. Objective lens 700 comprises lens element 702, entry lens shell 704, and exit lens shell 706.

Objective lens 700 is analogous to objective lens 102.

Lens element 702 comprises hemispheres 708 and 710. Each of hemispheres 708 and 710 comprise glass having a refractive index of approximately 1.486561 and an Abbe number of approximately 84.467994.

Hemispheres 708 and 710 are joined at a central plane comprising center point 112 to collectively define a shape that is substantially a sphere having a diameter of approximately 156.42 mm.

Hemisphere 708 comprises pedestal 714. Pedestal 714 is analogous to pedestal 314. Layer 320 is disposed on relieved surface 718.

Entry lens shell 704 is a curved shell section that is a portion of a spherical shell. Entry lens shell 704 comprises glass having a refractive index of approximately 2.022040 and an Abbe number of approximately 29.059788. Entry lens shell 704 has a substantially uniform thickness of approximately 56.792 mm.

Exit lens shell 706 is a curved shell section that is a portion of a spherical shell. Exit lens shell 706 comprises glass having a refractive index of approximately 1.66819 and an Abbe number of approximately 44.961828. Exit lens shell 706 has a substantially uniform thickness of approximately 59.181 mm.

Figure 8:
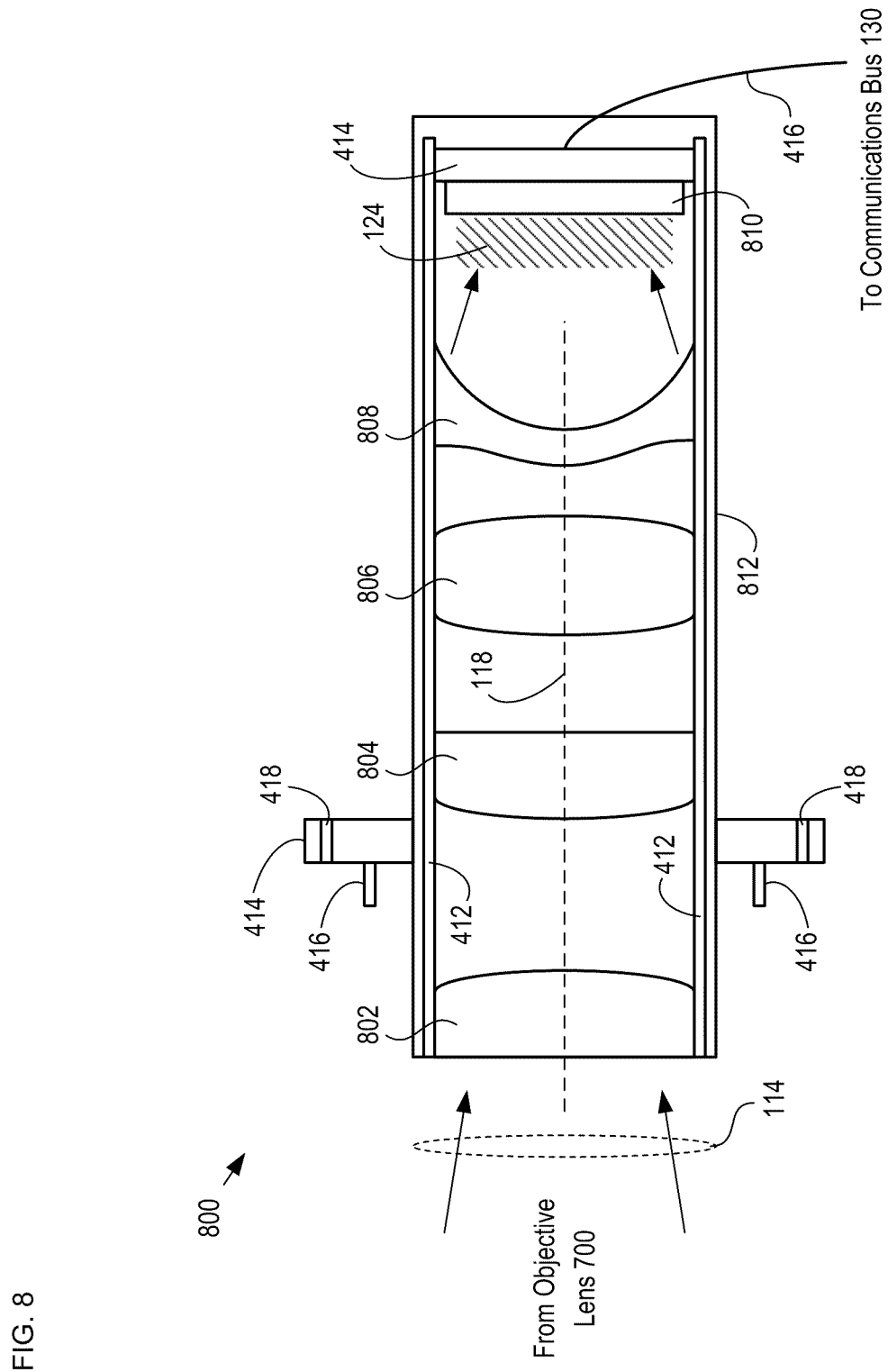
FIG. 8 depicts a schematic drawing of a cross-sectional view of a camera in accordance with the first alternative embodiment of the present invention.

FIG. 8 depicts a schematic drawing of a cross-sectional view of a camera in accordance with the first alternative embodiment of the present invention. Camera 800 comprises lens elements 802, 804, 806, and 808, sensor array 810, and housing 812.

Lens element 802 is a plano-convex lens having a diameter of approximately 5 mm. Lens element 802 comprises glass having a refractive index of approximately 1.677900 and an Abbe number of approximately 55.199566.

Lens element 804 is a convex-plano lens having a diameter of approximately 5 mm. Lens element 804 comprises glass having a refractive index of approximately 1.434250 and a relatively high Abbe number of approximately 94.953489.

Lens element 806 is a convex-convex lens having a diameter of approximately 5 mm. Lens element 806 comprises the same glass used in lens element 802.

Lens element 808 has a compound front surface and a concave back surface and has a diameter of approximately 5 mm. Lens element 808 comprises the same glass used in lens element 804.

Objective lens 700 and camera 800 are designed to operate cooperatively to produce optical sub-images having a diameter within the range of approximately 7 mm to approximately 8 mm.

Sensor array 810 is analogous to sensor array 106; however, sensor array 810 has a size suitable for completely sampling an optical sub-image having a diameter within the range of approximately 7 mm to approximately 8 mm.

FIG. 9A depicts a modulation transfer function curve for a multi-scale optical system in accordance with first alternative embodiment. Plot 900 depicts the MTF curve for an optical system comprising objective lens 700 and camera 800 at a sensor array 810.

FIG. 9B-E depict spot size diagrams for an optical system comprising objective lens 700 and camera 800 at a sensor array 810.

Figure 10:
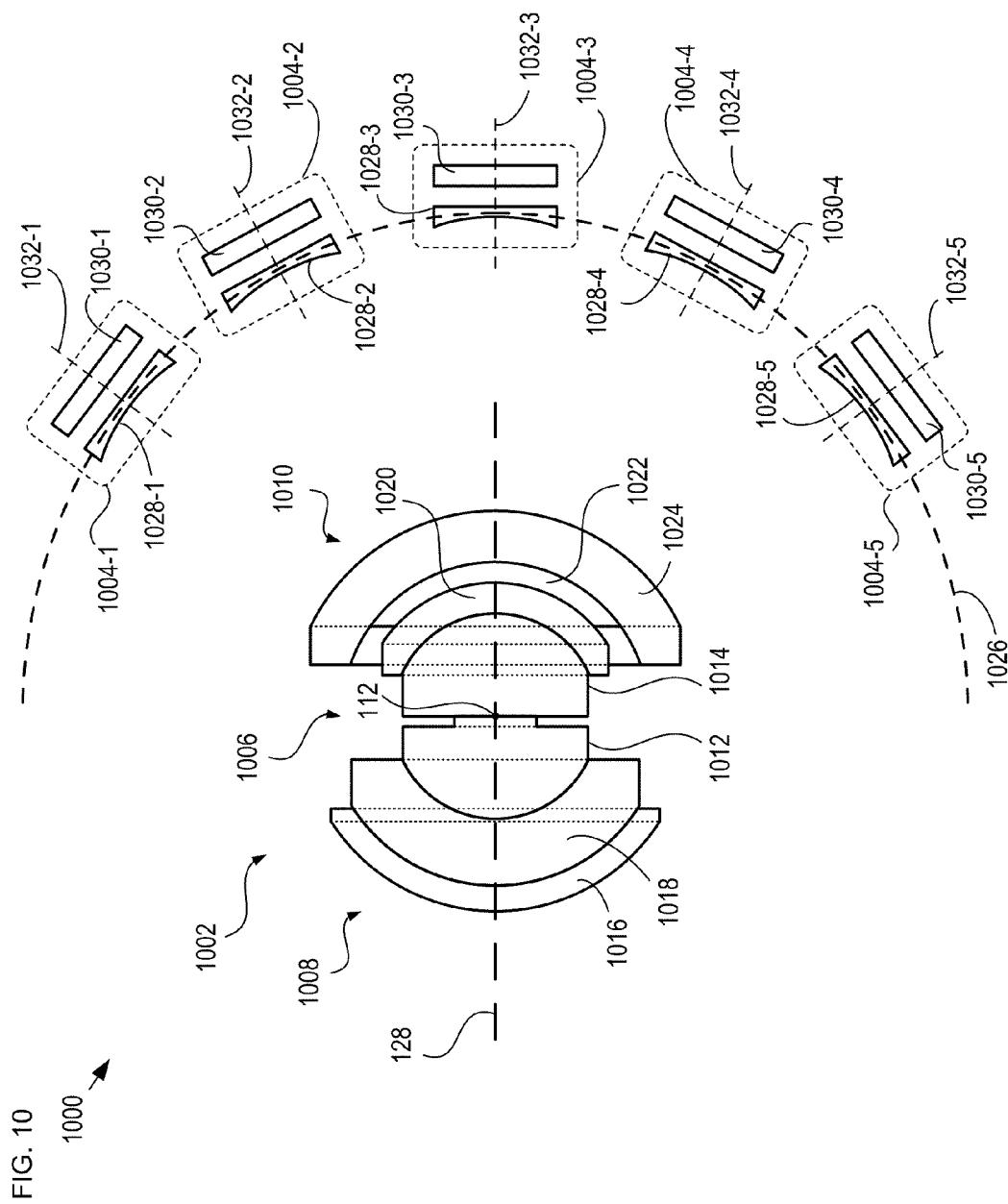
FIG. 10 depicts a schematic drawing of a cross-sectional view of an imaging system in accordance with a second alternative embodiment of the present invention.

FIG. 10 depicts a schematic drawing of a cross-sectional view of an imaging system in accordance with a second alternative embodiment of the present invention. System 1000 comprises objective lens 1002 and cameras 1004-1 through 1004-5.

Objective lens 1002 is a monocentric lens comprising lens element 1006, entry lens shell 1008, and exit lens shell 1010. Objective lens 1002 has an effective aperture of approximately 100 mm and achieves substantially diffraction-limited performance over a field-of-view of approximately 120 degrees. Objective lens 1002 is substantially achromatic over a wavelength range from approximately 450 nm to approximately 700 nm.

Lens element 1006 is analogous to lens element 302 described above and with respect to FIG. 3. Like lens element 302, lens element 1006 comprises calcium fluoride to exploit this material's low chromatic dispersion and provide positive focusing power for objective lens 1002.

Lens element 1006 comprises hemispheres 1012 and 1014. Hemispheres 1012 and 1014 collectively form a shape that is substantially a sphere. Lens element 1006 has a diameter of approximately 120 mm and includes an optical stop located approximately at center point 112 of the lens.

Entry lens shell 1008 comprises shell layers 1016 and 1018, which are in physical contact with each other. Shell layer 1018 is in physical contact with lens element 1006.

Shell layer 1016 is a curved shell section that is a portion of a spherical shell. Shell layer 1016 comprises glass having a refractive index of approximately 1.591965 and an Abbe number of approximately 48.509579. Shell layer 1016 has a substantially uniform thickness of approximately 17.043 mm.

TABLE 3

Design parameters for objective lens 700 and camera 800.

| Radius (mm) | Thickness (mm) | Glass (Schott catalog) | Semi-Diam. (mm) | Conic K | Comments |
|---|---|---|---|---|---|
| 135.000 | 56.792 | LASF35 (n = 2.022040, V = 29.059788) | 128.212 | | Objective entrance surface |
| 78.208 | 78.208 | FK51A (n = 1.486561, V = 84.467994) | 75.882 | | Internal FK51A sphere |
| Infinity | 78.208 | FK51A (n = 1.486561, V = 84.467994) | 39.813 | | Objective stop position |
| −78.208 | 59.181 | BAF13 (n = 1.66819, V = 44.961828) | 74.114 | | |
| −137.389 | 162.611 | Air | 125.621 | | Objective exit surface |
| 89.806 | 3.538 | LAKN12 (n = 1.677900, V = 55.199566) | 5.000 | | Start of microlens |
| −21.746 | 26.434 | Air | 5.000 | −1.092 | |
| 14.612 | 3.978 | FK56 (n = 1.434250, V = 94.953489) | 5.000 | −4.310 | |
| 2123.027 | 6.494 | Air | 5.000 | | Microlens stop position |
| 19.622 | 7.348 | LAKN12 (n = 1.677900, V = 55.199566) | 5.000 | | |
| −21.569 | 3.580 | Air | 5.000 | | |
| 10.735 | 4.207 | FK56 (n = 1.434250, V = 94.953489) | 5.000 | −10.122 | |
| 3.006 | 6.000 | Air | 5.000 | −0.919 | End of microlens |
| Infinity | — | Image Plane | 3.622 | | Image Plane |

Shell layer 1018 is a curved shell section that is a portion of a spherical shell. Shell layer 1018 comprises glass having a refractive index of approximately 1.753930 and an Abbe number of approximately 52.270764. Shell layer 1018 has a substantially uniform thickness of approximately 44.792 mm.

Exit lens shell 1010 comprises shell layers 1020 and 1024, which are separated by a air gap 1022, which has a substantially uniform thickness of approximately 12.291 mm.

Shell layer 1020 is a curved shell section that is a portion of a spherical shell. Shell layer 1020 comprises glass having a refractive index of approximately 1.772500 and an Abbe number of approximately 49.620227. Shell layer 1020 has a substantially uniform thickness of approximately 16.213 mm.

Shell layer 1022 is a curved shell section that is a portion of a spherical shell. Shell layer 1022 comprises glass having a refractive index of approximately 1.640480 and an Abbe number of approximately 59.749915. Shell layer 1022 has a substantially uniform thickness of approximately 42.171 mm.

The inclusion of air gap 1022 between shell layers 1020 and 1024 enables substantially control of spherical aberration correction that is substantially independent from control of chromatic aberration correction. Spherical aberration control can be implemented by controlling the thickness of air gap 1022, which is inherently achromatic.

Objective lens 1002 produces an image at spherically shaped image field 1026.

Each of cameras 1004-1 through 1004-5 (referred to, collectively, as cameras 1004) comprises a secondary lens 1028 and a sensor array 1030. Cameras 1004 are arranged in a substantially spherically shaped arrangement, centered at center point 112, such that each of secondary lenses 1028 is located at image field 1026.

Sensor array 1030 is analogous to sensor array 106 described above and with respect to FIG. 1. Conventional packaging for a sensor array, such as sensor array 1030 includes an optical window located above the array of sensors. In the illustrative embodiment, secondary lens 1028 is formed by polishing the outward surface of the sensor package window to form a concave lens having a radius-of-curvature of approximately 101.810 mm (wherein the window comprises BK7 glass).

Secondary lens 1028 provides curvature-of-field correction over the included angle of the field-of-view of camera 1004. Typically the field-of-view of each of cameras 1004 is approximately 4 degrees; however, it will be clear to one skilled in the art, after reading this specification, how to specify, make, and use alternative embodiments of the present invention wherein cameras 1004 have any practical field-of-view.

Table 4 below summarizes the design parameters for system 1000.

TABLE 4

Design parameters for a optical system 1000.

| Radius (mm) | Thickness (mm) | Glass (Schott catalog) | Semi-Diameter (mm) | Comments |
|---|---|---|---|---|
| 120.000 | 17.043 | KZFS6 (n = 1.591965, V = 48.509579) | 114.143 | |
| 102.957 | 44.792 | LAK33A (n = 1.753930, V = 52.270764) | 98.582 | |
| 58.165 | 58.165 | CAF2 (n = 1.433848, V = 95.232905) | 57.172 | Internal CAF2 sphere |
| Infinity | 58.165 | CAF2 (n = 1.433848, V = 95.232905) | 37.271 | Stop position |
| −58.165 | 16.213 | LAF34 (n = 1.772500, V = 49.620227) | 56.264 | |
| −74.377 | 12.291 | Air | 70.830 | |
| −86.669 | 42.171 | LAKL21 (n = 1.640480, V = 59.749915) | 81.112 | |
| −128.840 | 150.147 | Air | | |
| −101.810 | 1.000 | BK7 (n = 1.516800, V = 64.167336) | 10.0 | Field curvature corrector |
| Infinity | 0.500 | Air | 10.0 | window |
| Infinity | — | Image Plane | 10.0 | 20 mm diagonal sensor |

Secondary lens 1028 provides curvature-of-field correction over the included angle of the field-of-view of camera 1004. Typically the field-of-view of each of cameras 1004 is approximately 4 degrees; however, it will be clear to one skilled in the art, after reading this specification, how to specify, make, and use alternative embodiments of the present invention wherein cameras 1004 have any practical field-of-view.

Figure 11:
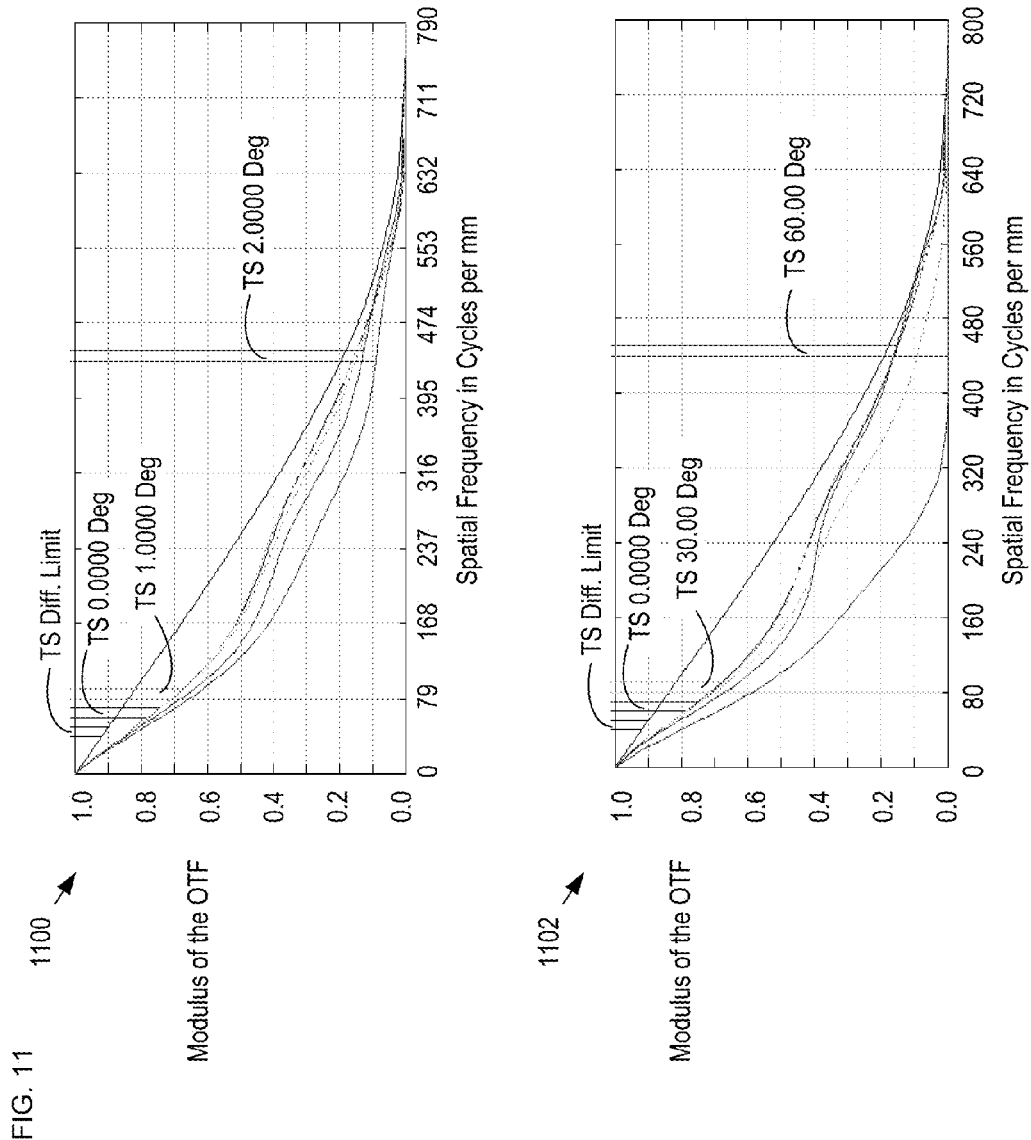

FIG. 11 depicts modulation transfer function curves for optical system 1000. Plot 1102 depicts the MTF curve at a single 8-mm sensor array 1030, wherein secondary lens 1028 has an approximately 8 degree field-of-view. Plot 1104 depicts the MTF curve for optical system 1000 for a field-of-view of up to approximately 60 degrees off-axis from optical axis 128.

Figure 12:
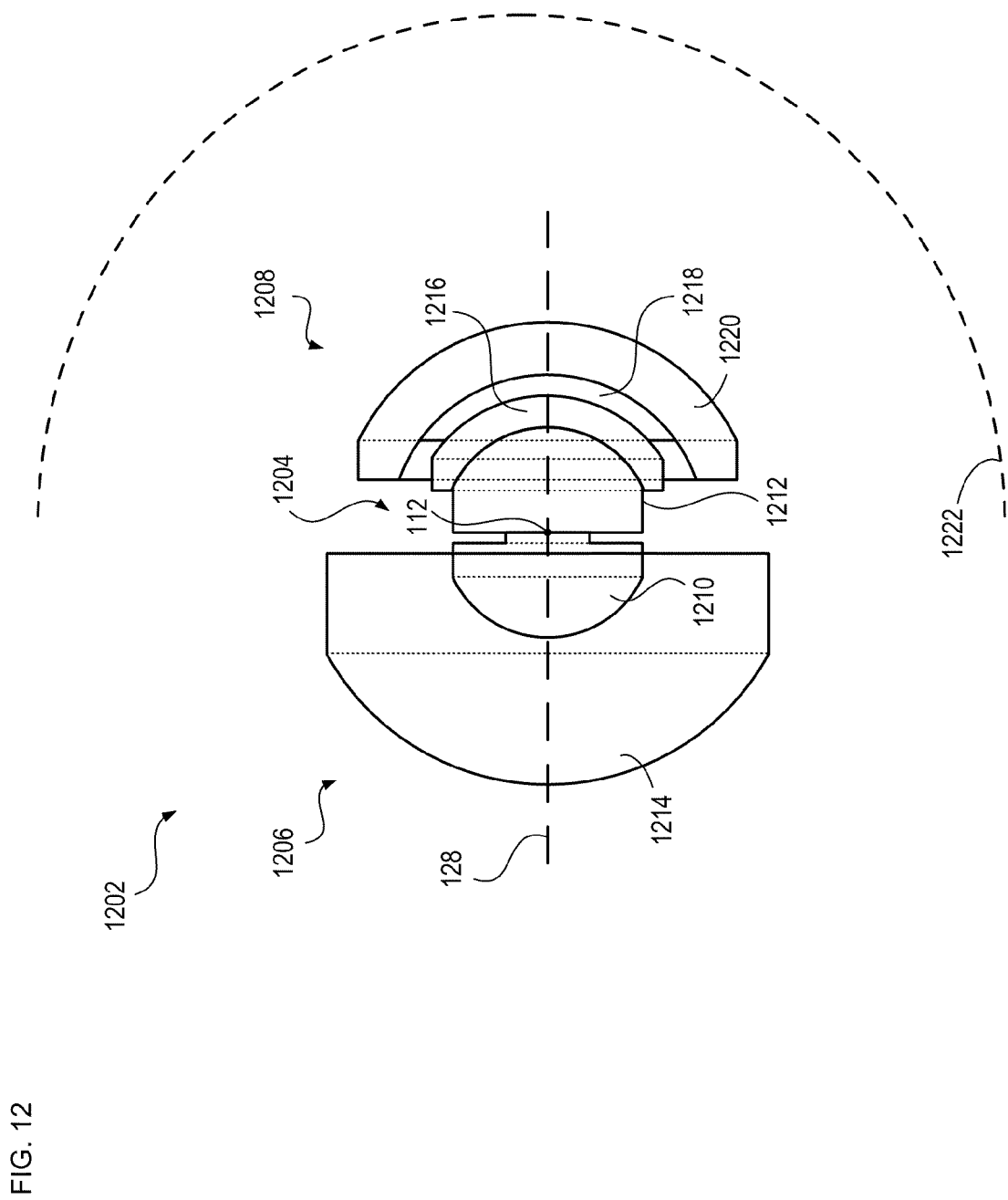
FIG. 12 depicts a schematic drawing of a cross-sectional view of an objective lens in accordance with a third alternative embodiment of the present invention.

FIG. 12 depicts a schematic drawing of a cross-sectional view of an objective lens in accordance with a third alternative embodiment of the present invention. Objective lens 1202 is a monocentric lens comprising lens element 1204, entry lens shell 1206, and exit lens shell 1208. Objective lens 1202 is analogous to objective lens 1002, but has an effective aperture that is less than 100 mm. Objective lens 1202 is suitable for use in an optical system analogous to optical system 1000.

Lens element 1204 comprises hemispheres 1210 and 1212, each of which comprises calcium fluoride. Hemispheres 1210 and 1212 collectively form a shape that is substantially a sphere. Lens element 1204 has a diameter of approximately 33 mm and includes an optical stop located approximately at center point 112 of the lens.

Entry lens shell 1206 is a curved shell section that is a portion of a spherical shell. Entry lens shell 1206 comprises glass having a refractive index of approximately 1.696732 and an Abbe number of approximately 56.420174. Entry lens shell 1206 is in physical contact with lens element 1204 and has a substantially uniform thickness of approximately 23.457 mm.

Exit lens shell 1208 comprises shell layers 1216 and 1220, which are separated by air gap 1218, which has a substantially uniform thickness of approximately 4.076 mm.

Shell layer 1216 is a curved shell section that is a portion of a spherical shell. Shell layer 1216 comprises glass having a refractive index of approximately 1.835010 and an Abbe number of approximately 43.129044. Shell layer 1216 has a substantially uniform thickness of approximately 5.053 mm.

Shell layer 1220 is a curved shell section that is a portion of a spherical shell. Shell layer 1220 comprises glass having a refractive index of approximately 1.640480 and an Abbe number of approximately 59.749915. Shell layer 1220 has a substantially uniform thickness of approximately 42.171 mm.

Objective lens 1202 produces an image at spherically shaped image field 1222. In similar fashion to optical system 1000, objective lens 1202 is suitable for use with a plurality of cameras (analogous to cameras 1004), located at image field 1222, used to relay image portions of a scene through objective lens 1202.

Table 5 below summarizes the design parameters for objective lens 1202.

TABLE 5

Design parameters for objective lens 1202.

| Radius (mm) | Thickness (mm) | Glass (Schott catalog) | Semi-Diameter (mm) | Comments |
| --- | --- | --- | --- | --- |
| 40.000 | 23.457 | LAK31 (n = 1.696732, V = 56.420174) | 38.021 | |
| 16.543 | 16.543 | CAF2 (n = 1.433848, V = 95.232905) | 16.384 | Internal CAF2 sphere |
| Infinity | 16.543 | CAF2 (n = 1.433848, V = 95.232905) | 12.140 | Stop position |
| −16.543 | 5.053 | LASF41 (n = 1.835010, V = 43.129044) | 16.223 | |
| −21.596 | 4.076 | Air | 20.855 | |
| −25.671 | 7.998 | PK1 (n = 1.503781, V = 66.921827) | 24.307 | |
| −33.669 | 45.508 | Air | | |

Figure 13:
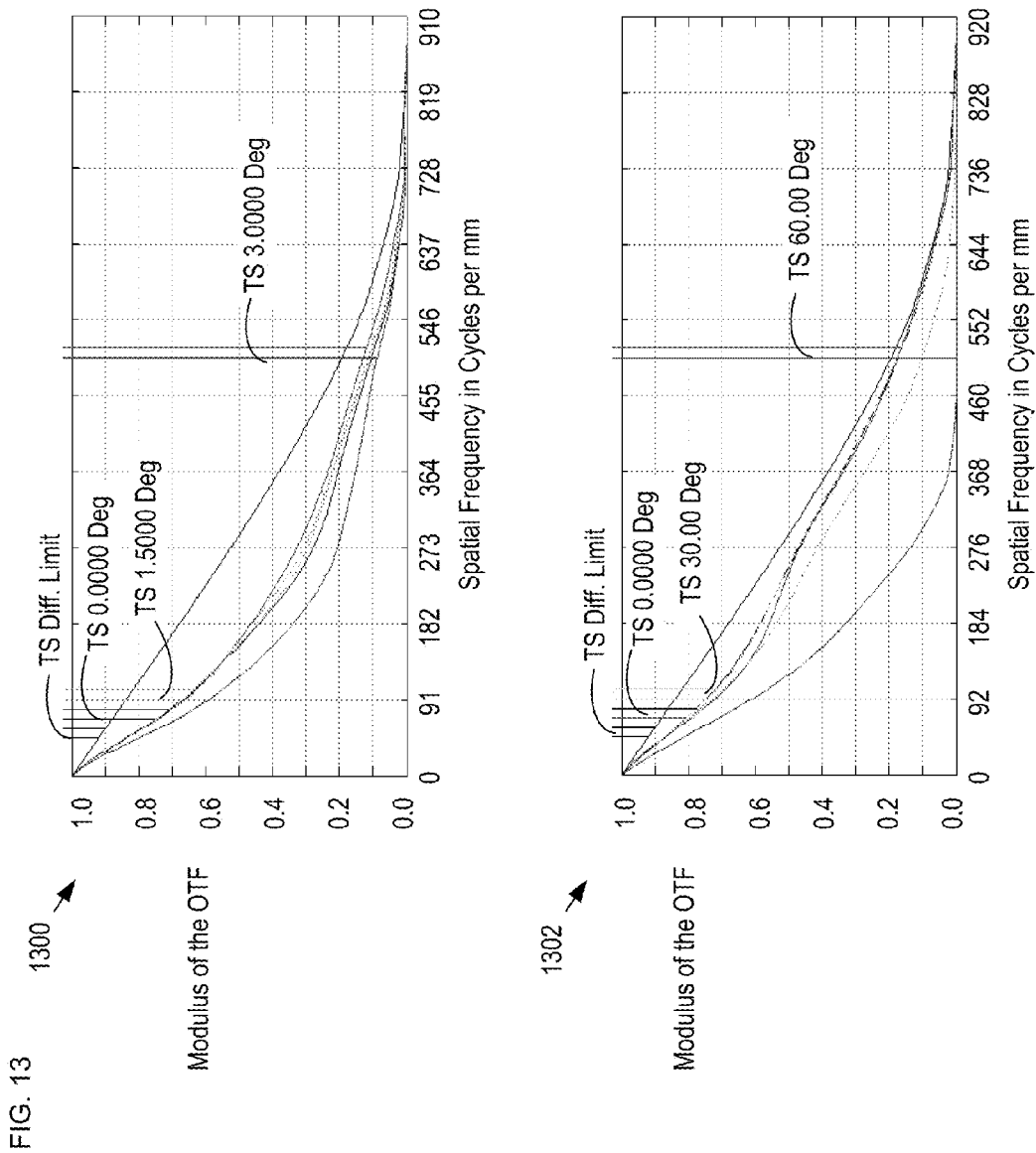
FIG. 13 depicts modulation transfer function curves for objective lens 1202.

FIG. 13 depicts modulation transfer function curves for objective lens 1202. Plot 1202 depicts the MTF curve using a single 10-mm sensor array with a secondary lens for providing curvature-of-field correction, wherein the secondary lens has an approximately 6 degree field-of-view. Plot 1204 depicts the MTF curve for objective lens 1202 (and suitable secondary lenses) for a field-of-view of up to approximately 60 degrees off-axis from optical axis 128.

Figure 14:
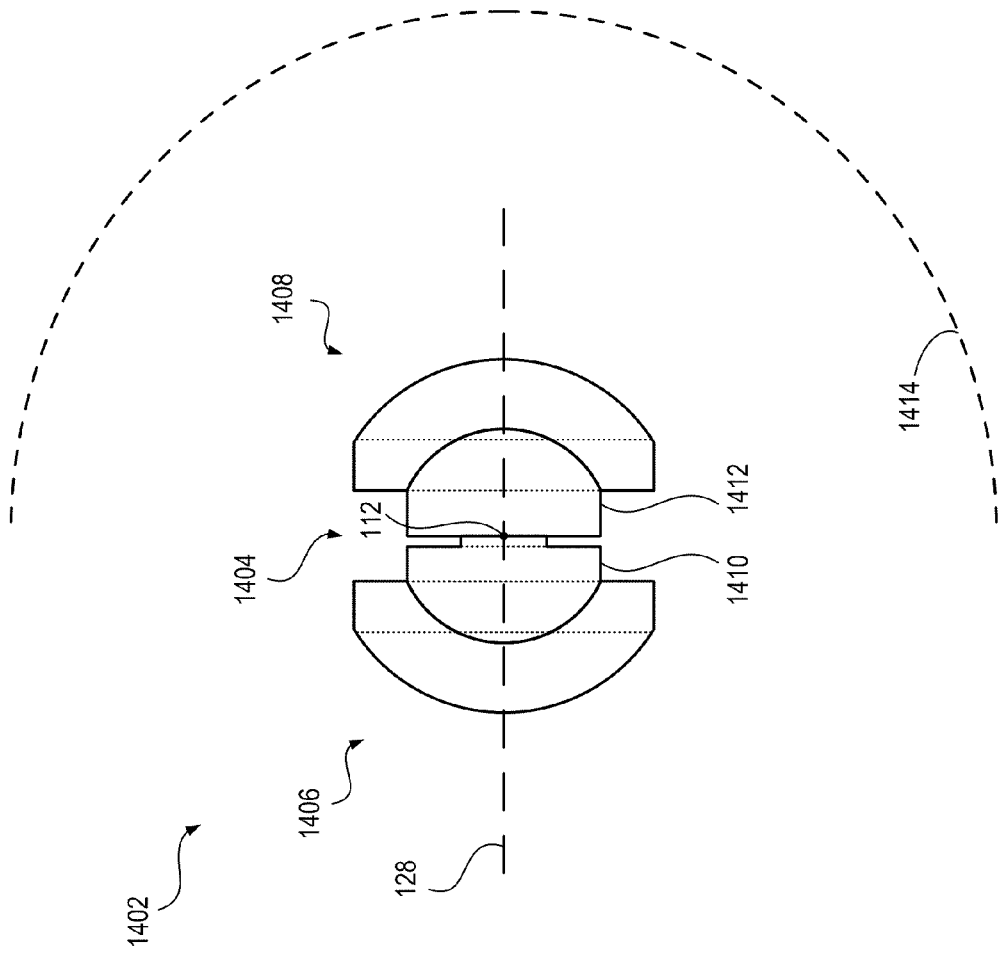
FIG. 14 depicts a schematic drawing of a cross-sectional view of an objective lens in accordance with a fourth alternative embodiment of the present invention.

FIG. 14 depicts a schematic drawing of a cross-sectional view of an objective lens in accordance with a fourth alternative embodiment of the present invention. Objective lens 1402 is a monocentric lens comprising lens element 1404, entry lens shell 1406, and exit lens shell 1408. Objective lens 1402 is analogous to objective lens 1002, but has an effective aperture that is less than 75 mm. Objective lens 1402 is suitable for use in an optical system analogous to optical system 1000.

Lens element 1404 comprises hemispheres 1410 and 1412, each of which comprises calcium fluoride. Hemispheres 1410 and 1412 collectively form a shape that is substantially a sphere. Lens element 1404 has a diameter of approximately 23 mm and includes an optical stop located approximately at center point 112 of the lens.

Entry lens shell 1406 is a curved shell section that is a portion of a spherical shell. Entry lens shell 1406 comprises glass having a refractive index of approximately 1.696732 and an Abbe number of approximately 56.420174. Entry lens shell 1406 is in physical contact with lens element 1404 and has a substantially uniform thickness of approximately 8.358 mm.

Exit lens shell 1408 is a curved shell section that is a portion of a spherical shell. Exit lens shell 1408 comprises glass having a refractive index of approximately 1.637750 and an Abbe number of approximately 42.410177. Exit lens shell 1408 is in physical contact with lens element 1404 and has a substantially uniform thickness of approximately 9.53 mm.

Objective lens 1402 produces an image at spherically shaped image field 1414. In similar fashion to optical system 1000, objective lens 1402 is suitable for use with a plurality of cameras (analogous to cameras 1002), located at image field 1414, used to relay image portions of a scene through objective lens 1402.

Table 6 below summarizes the design parameters for objective lens 1402.

TABLE 6

Design parameters for objective lens 1402.

| Radius (mm) | Thickness (mm) | Glass (Schott catalog) | Semi-Diameter (mm) | Comments |
| --- | --- | --- | --- | --- |
| 20.000 | 8.358 | LAK31 (n = 1.696732, V = 56.420174) | 19.024 | |
| 11.642 | 11.642 | CAF2 (n = 1.433848, V = 95.232905) | 11.351 | Internal CAF2 sphere |
| Infinity | 11.642 | CAF2 (n = 1.433848, V = 95.232905) | 6.343 | Stop position |
| −11.642 | 9.530 | KZFS11 (n = 1.637750, V = 42.410177) | 11.059 | |
| −21.172 | 23.419 | Air | | |

Figure 15:
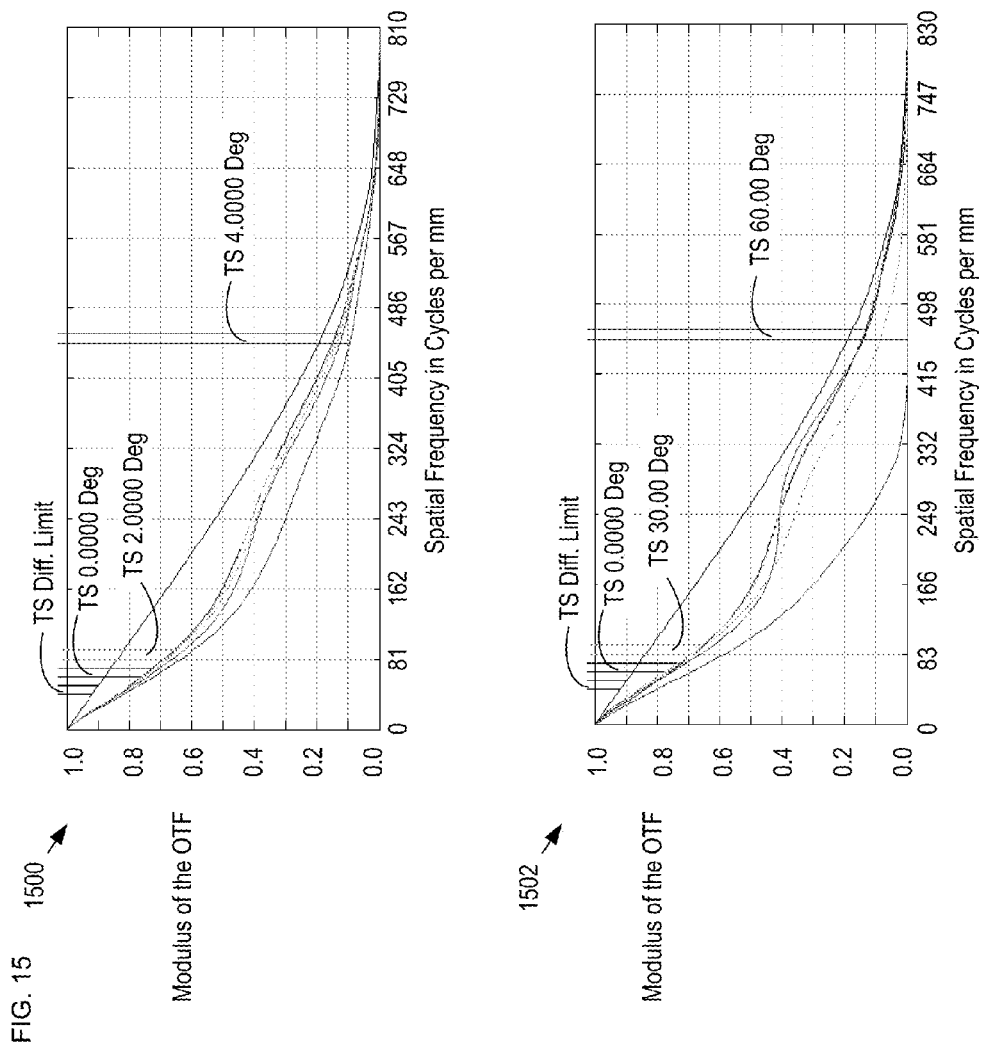
FIG. 15 depicts modulation transfer function curves for objective lens 1402.

FIG. 15 depicts modulation transfer function curves for objective lens 1402. Plot 1402 depicts the MTF curve using a single 10-mm sensor array with a secondary lens for providing curvature-of-field correction, wherein the secondary lens has an approximately 8 degree field-of-view. Plot 1404 depicts the MTF curve for objective lens 1402 (and suitable secondary lenses) for a field-of-view of up to approximately 60 degrees off-axis from optical axis 128.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An optical system for providing an image of a scene, the optical system comprising:
    (1) a first lens that is operative for imaging the scene at an image field, the first lens comprising;
        (a) a first lens element that is a sphere having a center at a first position, the first lens element comprising;

(i) a first hemisphere having a first surface whose center of curvature is located at the first position; and (ii) a second hemisphere having a second surface whose center of curvature is located at the first position;

wherein the first lens element imparts a first aberration with a first magnitude on light that transits the first lens element;

(b) an entry lens shell having a uniform thickness and a center of curvature at the first position; and (c) an exit lens shell having a uniform thickness and a center of curvature at the first position, wherein the exit lens shell comprises a first shell layer and a second shell layer, and wherein each of the first shell layer and the second shell layer has uniform thickness, and further wherein the first shell layer and second shell layer are separated by an air gap;

wherein the first lens element interposes the entry lens shell and exit lens shell, and wherein the first lens element, the entry lens shell, and the exit lens shell collectively impart the first aberration with a second magnitude on light that propagates through the first lens, and wherein the second magnitude is less than the first magnitude; and (2) a plurality of cameras, each camera comprising a second lens and a sensor array, the second lens being operative for relaying a portion of the image field onto the sensor array, and the second lens and sensor array collectively defining a unique optical axis for their respective camera.

2. The optical system of claim 1 wherein at least one of the plurality of second lenses is operative for correcting curvature-of-field.

3. The optical system of claim 1 wherein at least one of the plurality of second lenses is operative for correcting at least one of spherical aberration and chromatic aberration.

4. The optical system of claim 1 wherein the first lens element imparts a second aberration with a third magnitude on light that transits the first lens element, and wherein the first lens element, the entry lens shell, and the exit lens shell collectively impart the second aberration with a fourth magnitude on light that propagates through the first lens, and wherein the fourth magnitude is less than the third magnitude.

5. The optical system of claim 4 wherein the first aberration is spherical aberration and the second aberration is chromatic aberration.

6. The optical system of claim 1 wherein the air gap is dimensioned and arranged such that the first lens has a first focal length for each of a first wavelength, second wavelength, and third wavelength.

7. The optical system of claim 1 wherein the first lens comprises an optical stop.

8. The optical system of claim 1 wherein the first lens has a first focal length for each of a first wavelength, second wavelength, and third wavelength.

9. The optical system of claim 1 wherein the plurality of second lenses is arranged in a first arrangement that is spherical.

10. The optical system of claim 9 wherein the plurality of sensor arrays is arranged in a second arrangement that is spherical.

11. An optical system for providing an image of a scene, the optical system comprising:

(1) a first lens that is monocentric about a first position, the first lens being operative for forming an intermediate image of the scene at an image field, and the first lens comprising;

(a) an entry lens shell;

(b) an exit lens shell; and (c) a first lens element that interposes the entry lens shell and the exit lens shell, the first lens element comprising;

(i) a first hemisphere having a first surface whose center of curvature is located at the first position; and (ii) a second hemisphere having a second surface whose center of curvature is located at the first position;

wherein the first lens element, the entry lens shell, and the exit lens shell are collectively apochromatic;

wherein the first lens comprises an entry surface and a plurality of internal surfaces comprising the first surface and second surface;

wherein the first lens is dimensioned and arranged such that light that transits the first lens is subject to (1) a first aberration that is introduced by the entry surface and (2) a second aberration that is collectively introduced by the plurality of internal surfaces; and wherein the first aberration and the second aberration are the same aberration and of opposite sign; and (2) a plurality of second lenses, each being operative for relaying a portion of the image field to form an optical sub-image at a different one of a plurality of focal regions, wherein each of the plurality of second lenses has a unique optical axis, and wherein each of the plurality of second lenses is operative for reducing the magnitude of the first aberration.

12. The optical system of claim 11 wherein the first aberration is spherical aberration.

13. The optical system of claim 11 further comprising a plurality of sensor arrays, each sensor array being located at a different one of the plurality of focal regions.

14. The optical system of claim 11 wherein the entry lens shell comprises a plurality of shell layers.

15. The optical system of claim 11 wherein the exit lens shell comprises a first shell and a second shell layer, and wherein each of the first shell layer and the second shell layer has uniform thickness, and further wherein the first shell layer and second shell layer are separated by an air gap.

16. The optical system of claim 15 wherein the first shell layer and second shell layer are separated by an air gap.

17. The optical system of claim 11 wherein the first lens further comprises an optical stop.

18. The optical system of claim 11 wherein the first lens element comprises a material having a refractive index within the range of approximately 1.28 to approximately 1.52.

19. The optical system of claim 11 wherein the first lens element comprises calcium fluoride.

20. The optical system of claim 19 wherein at least one of the entry lens shell and the exit lens shell comprises flint glass.

21. The optical system of claim 19 wherein at least one of the entry lens shell and the exit lens shell comprises crown glass.

22. The optical system of claim 11 further comprising a plurality of sensor arrays, wherein the plurality of sensor arrays are arranged to receive the plurality of optical sub-images.

23. The optical system of claim 11 wherein the plurality of second lenses is arranged in a first arrangement that is spherical.

24. The optical system of claim 23 wherein the plurality of sensor arrays is arranged in a second arrangement that is spherical.

25. A method for providing an image of a scene, the method comprising:
forming an intermediate image of the scene, wherein the intermediate image is formed by a first lens that is monocentric about a first position;
forming a plurality of sub-images of the scene, wherein each of the plurality of sub-images is formed by one of a plurality of second lenses that relays a portion of the intermediate image as a sub-image at a different one of a plurality of focal regions, and wherein each of the plurality of second lenses has a unique optical axis; and
reducing a first aberration at least one of the plurality of second lenses.

26. The method of claim 25, wherein the first aberration is one of spherical aberration and chromatic aberration.

27. The method of claim 25 wherein the first lens is provided such that it comprises an optical stop.

28. The method of claim 25 further comprising converting each of the plurality of sub-images into a digital representation of a portion of the scene.

29. The method of claim 28 further comprising forming a composite digital representation of the scene based on the plurality of digital representations.

30. The method of claim 25 further comprising providing the first lens such that it comprises a first lens element that is spherical about the first position, an entry lens shell, and an exit lens shell, and wherein the first lens element comprises:
a first hemisphere having a first surface whose center of curvature is located at the first position; and
a second hemisphere having a second surface whose center of curvature is located at the first position.

31. The method of claim 30 wherein the first lens is provided such that the first lens element introduces a second aberration with a third magnitude on light that transits the first lens element, and wherein the first lens collectively introduces the second aberration with a fourth magnitude on light that transits the first lens, and further wherein the fourth magnitude is less than the third magnitude.

32. The method of claim 31 wherein the first lens is provided such that the first aberration is spherical aberration and the second aberration is chromatic aberration.

33. The method of claim 30 wherein the first lens is provided such that the exit lens shell comprises a first shell layer and a second shell layer, and wherein the first shell layer and second shell layer are separated by an air gap.

34. The method of claim 30 wherein the first lens is provided such that the first lens element, entry lens shell, and exit lens shell are collectively apochromatic.

35. The method of claim 30 wherein the first lens is provided such that the entry lens shell and exit lens shell are characterized by different refractive indices.

* * * * *